US007373429B2

(12) United States Patent
Furukawa et al.

(10) Patent No.: US 7,373,429 B2
(45) Date of Patent: May 13, 2008

(54) INTEGRATED IP NETWORK

(75) Inventors: Hisao Furukawa, Saitama (JP); Shoji Miyaguchi, Chiba (JP)

(73) Assignees: The Distribution Systems Research Institute, Tokyo (JP); Miyaguchi Research Co., Ltd., Chiba (JP)

(*) Notice: Subject to any disclaimer, the term of this patent is extended or adjusted under 35 U.S.C. 154(b) by 843 days.

(21) Appl. No.: 10/620,785

(22) Filed: Jul. 15, 2003

(65) Prior Publication Data

US 2004/0054810 A1 Mar. 18, 2004

Related U.S. Application Data

(62) Division of application No. 09/568,515, filed on May 9, 2000, now Pat. No. 6,711,623.

(30) Foreign Application Priority Data

May 10, 1999 (JP) ................................ 11-128956
Jan. 21, 2000 (JP) ................................ 2000-13154

(51) Int. Cl.
*G06F 15/16* (2006.01)

(52) U.S. Cl. ...................... 709/249; 709/245; 709/225; 709/238; 370/356; 370/352; 370/353; 370/354; 370/355

(58) Field of Classification Search ..................... None
See application file for complete search history.

(56) References Cited

U.S. PATENT DOCUMENTS 4,933,937 A 6/1990 Konishi ................... 370/85.13

(Continued)

FOREIGN PATENT DOCUMENTS

EP 0 698 975 A2 2/1996

(Continued)

OTHER PUBLICATIONS

U.S. Appl. No. 09/165,212, filed Oct. 2, 1998, Furukawa et al.

(Continued)

*Primary Examiner*—Bunjob Jaroenchonwanit
*Assistant Examiner*—Dohm Chankong
(74) *Attorney, Agent, or Firm*—Ladas & Parry LLP

(57) ABSTRACT

To provide an integrated IP network containing therein a plurality of separated IP networks with a variety of characteristics, such as IP telephone network, IP video network, IP electronic text network, best effort network, IP data multicast network and IP-based TV broadcast network. In the integrated IP network there are virtually installed a plurality of IP networks with various features, such as IP telephone network, IP video network, IP electronic text network, best effort network, IP data multicast network and IP-based TV broadcast network. An address management table is set in each of the network node devices installed at input points through which the integrated IP network is accessed from outside. The address management table is registered beforehand with terminal addresses and port numbers identifying the application programs (AP) in the terminal. The address and port number written in the IP packet entered into the integrated IP network are compared with those registered in the address management table to route, inside the integrated IP network, the IP packet to an appropriate IP network. The port number may not be used and only the addresses may be compared.

7 Claims, 17 Drawing Sheets

U.S. PATENT DOCUMENTS

| | | | | |
|---|---|---|---|---|
| 5,732,078 A | | 3/1998 | Arango | 370/355 |
| 5,751,971 A | | 5/1998 | Dobbins et al. | 709/238 |
| 5,825,772 A | | 10/1998 | Dobbins et al. | 370/396 |
| 5,867,495 A | * | 2/1999 | Elliott et al. | 370/352 |
| 5,898,830 A | | 4/1999 | Wesinger, Jr. et al. | 395/187.01 |
| 5,999,612 A | | 12/1999 | Dunn et al. | 379/212 |
| 6,069,890 A | | 5/2000 | White et al. | 370/352 |
| 6,075,783 A | | 6/2000 | Voit | 370/352 |
| 6,094,431 A | | 7/2000 | Yamato et al. | 370/395 |
| 6,104,711 A | | 8/2000 | Voit | 370/352 |
| 6,145,011 A | | 11/2000 | Furukawa et al. | 709/245 |
| 6,233,234 B1 | | 5/2001 | Curry et al. | 370/356 |
| 6,243,379 B1 | | 6/2001 | Veerina et al. | 370/389 |
| 6,249,820 B1 | | 6/2001 | Dobbins et al. | 709/238 |
| 6,252,952 B1 | | 6/2001 | Kung et al. | 379/114.1 |
| 6,295,293 B1 | | 9/2001 | Tonnby et al. | 370/389 |
| 6,321,337 B1 | | 11/2001 | Reshef et al. | 726/14 |
| 6,324,280 B2 | | 11/2001 | Dunn et al. | 379/230 |
| 6,339,594 B1 | | 1/2002 | Civanlar et al. | 370/352 |
| 6,353,614 B1 | | 3/2002 | Borella et al. | 370/369 |
| 6,396,840 B1 | | 5/2002 | Rose et al. | 370/401 |
| 6,456,615 B1 | * | 9/2002 | Kikinis | 370/352 |
| 6,457,061 B1 | | 9/2002 | Bal et al. | 709/245 |
| 6,459,697 B1 | * | 10/2002 | Neyman | 370/352 |
| 6,515,985 B2 | * | 2/2003 | Shmulevich et al. | 370/356 |
| 6,523,069 B1 | | 2/2003 | Luczycki et al. | 709/249 |
| 6,654,456 B1 | | 11/2003 | Mandalia et al. | 379/220.01 |
| 6,724,747 B1 | | 4/2004 | Arango et al. | 370/352 |
| 6,807,169 B2 | * | 10/2004 | Mattathil | 370/352 |
| 6,856,676 B1 | * | 2/2005 | Pirot et al. | 379/201.01 |
| 6,934,278 B1 | | 8/2005 | Champa et al. | 370/352 |
| 6,970,941 B1 | | 11/2005 | Caronni et al. | |
| 6,977,929 B1 | | 12/2005 | Caronni et al. | |
| 6,987,781 B1 | | 1/2006 | Miller et al. | 370/496 |
| 7,006,433 B1 | | 2/2006 | Dantu et al. | 370/218 |
| 7,028,100 B2 | | 4/2006 | Furukawa et al. | |
| 7,032,242 B1 | | 4/2006 | Grabelsky et al. | |
| 7,047,561 B1 | | 5/2006 | Lee | 726/12 |
| 7,107,614 B1 | | 9/2006 | Boden et al. | |
| 7,209,472 B2 | * | 4/2007 | Ohta et al. | 370/351 |
| 2002/0009073 A1 | | 1/2002 | Furukawa et al. | 370/352 |
| 2002/0059432 A1 | * | 5/2002 | Masuda et al. | 709/227 |
| 2002/0118676 A1 | | 8/2002 | Tonnby et al. | 370/352 |
| 2002/0124084 A1 | | 9/2002 | Furukawa et al. | 709/225 |
| 2002/0152311 A1 | | 10/2002 | Veltman et al. | 709/227 |
| 2002/0196782 A1 | | 12/2002 | Furukawa et al. | |
| 2003/0012183 A1 | * | 1/2003 | Butler et al. | 370/352 |
| 2005/0086379 A1 | | 4/2005 | Asami et al. | 709/245 |

FOREIGN PATENT DOCUMENTS

| | | |
|---|---|---|
| EP | 0 851 635 | 12/1997 |
| EP | 0 825 748 A2 | 2/1998 |
| EP | 0 851 653 A2 | 7/1998 |
| EP | 0 928 095 A2 | 7/1999 |
| EP | 0 973 343 A1 | 1/2000 |
| EP | 1 054 568 A2 | 11/2000 |
| GB | 2 313 981 A | 12/1997 |
| GB | 2 320 167 | 6/1998 |
| GB | 2 332 818 A | 6/1999 |
| GB | 2 352 111 | 1/2001 |
| JP | 11-088438 | 3/1999 |
| JP | 128956/1999 | 5/1999 |
| JP | 128956-19999 | 5/1999 |
| JP | 11-239178 | 8/1999 |
| JP | 3084681 | 9/2000 |
| WO | 97/23078 | 6/1997 |
| WO | 97/28628 | 8/1997 |
| WO | 97/31492 | 8/1997 |
| WO | 97/48051 | 12/1997 |
| WO | 98/06201 | 2/1998 |
| WO | 98/20724 | 5/1998 |
| WO | 98/30008 | 7/1998 |
| WO | 98/59523 | 12/1998 |
| WO | 99/14931 | 3/1999 |
| WO | 99/28827 | 6/1999 |
| WO | 99/37061 | 7/1999 |
| WO | 00/16206 | 3/2000 |
| WO | 00/51331 | 8/2000 |
| WO | 01/24499 | 4/2001 |
| WO | 01/37529 A1 | 5/2001 |

OTHER PUBLICATIONS

Hamdi, M., et al., "Voice Service Interworking for PSTN and IP Networks," *IEEE Communications Magazine*, vol. 37, No. 5, pp. 104-111 (May 1999).

"Packet-based multimedia communications systems," *ITU-T Recommendation H.323—Annex D*, (Sep. 1998), 10 pages.

Anquetil, L.-P., et al., "Media Gateway Control Protocol and Voice Over IP Gateways," *Alcatel Telecommunications Review*, 2nd Quarter, pp. 151-157 (1999).

Gbaguidi, C., et al., "A Programmable Architecture for the Provision of Hybrid Services," *IEEE Communications Magazine*, pp. 110-116 (Jul. 1999).

Hui, S.C., et al., "Towards a Standards-Based Internet Telephony System," *Computer Standards & Interfaces*, vol. 19, pp. 89-103 (1998).

Hunt, R., "Internet/Intranet Firewall Security—Policy, Architecture, and Transaction Services," *Computer Communications*, vol. 21, pp. 1107-1123 (1998).

Malkin, G.S., "Dial-In Virtual Private Networks Using Layer 3 Tunneling," *IEEE*, pp. 555-561 (1997).

Australian Written Opinion for Singapore Patent Application No. SG 200102034-6 (Date: Jun. 24, 2002; No. of pages: 6), which corresponds to the above-identified U.S. Appl. No. 10/165,326.

U.K. Search Report for U.K. Patent Application No. GB 0011091.6 (Date: Nov. 29, 2000; No. of pages: 1), which corresponds to the above-identified U.S. Appl. No. 10/165,326.

European Search Report for EPO Patent Application No. EP 01200880 (Date: Nov. 28, 2002; No. of pages: 4), which is related to the above-identified U.S. Appl. No. 10/165,326.

European Search Report, which was mailed on Oct. 20, 2003, for European Patent Application No. 01200880.1 (14 pages).

Giacometti, S., et al., "Tunnelling Effectiveness In The Access Environment," *38th European Telecommunications Congress*, pp. 101-105 (Aug. 24, 1999).

Nagami K Et Al: "VCID Notification for Label Switching" *IEICE Transactions on Information and Systems*, Institute of Electronic Information and Comm. Eng. Tokyo, JP, vol. E82-D, No. 4, pp. 863-869, Apr. 1999.

Black, ISDN and SS7, Prentice Hall, pp. 32-33 (1997).

Newton's Telecom Dictionary, CNP books, 2004, p. 481.

* cited by examiner

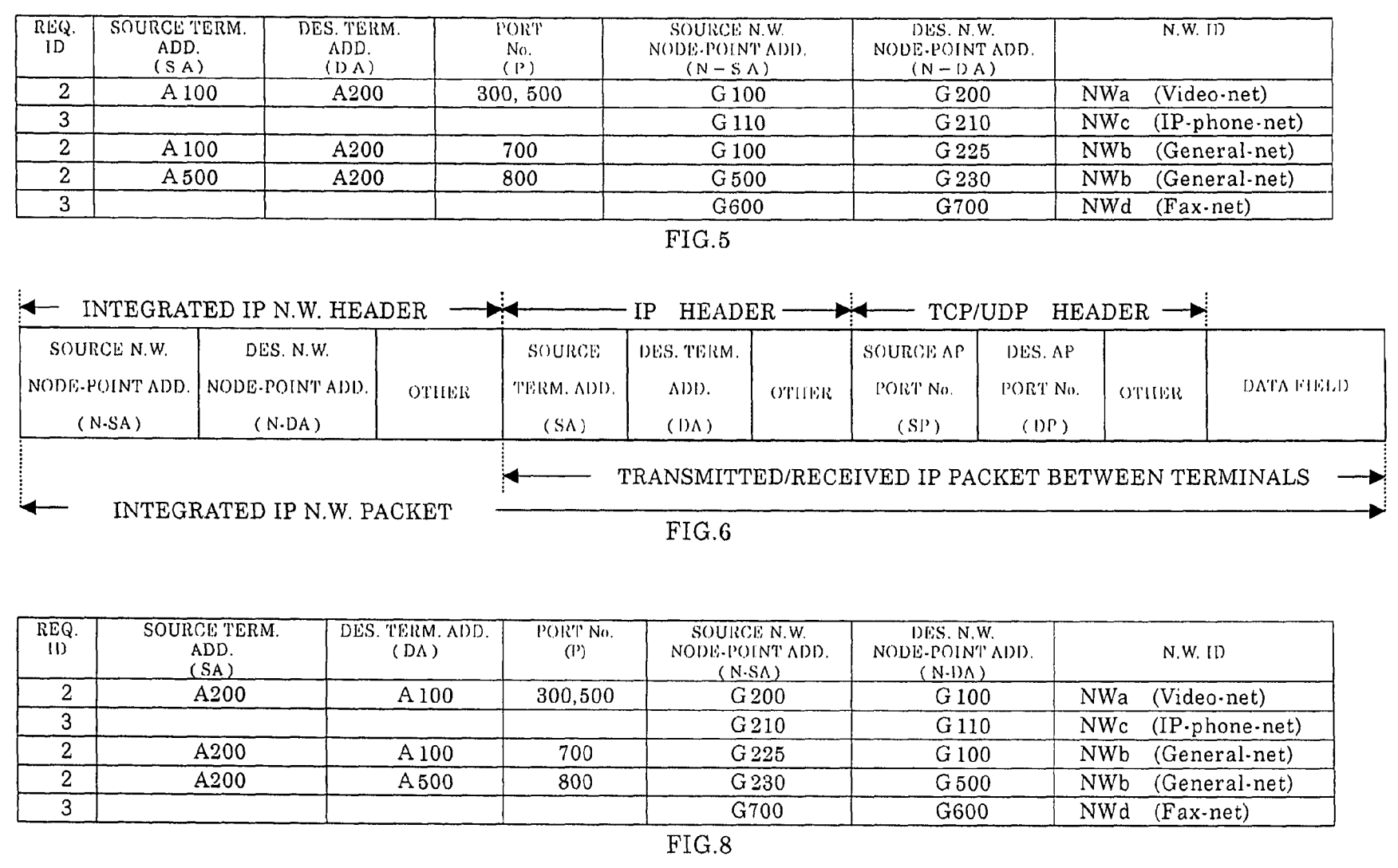

| REQ. ID | SOURCE TERM. ADD. (S A) | DES. TERM. ADD. (D A) | PORT No. (P) | SOURCE N.W. NODE-POINT ADD. (N − S A) | DES. N.W. NODE-POINT ADD. (N − D A) | N.W. ID |
|---|---|---|---|---|---|---|
| 2 | A 100 | A200 | 300, 500 | G 100 | G 200 | NWa (Video-net) |
| 3 | | | | G 110 | G 210 | NWc (IP-phone-net) |
| 2 | A 100 | A200 | 700 | G 100 | G 225 | NWb (General-net) |
| 2 | A 500 | A200 | 800 | G 500 | G 230 | NWb (General-net) |
| 3 | | | | G600 | G700 | NWd (Fax-net) |

FIG.5

| INTEGRATED IP N.W. HEADER | | | IP HEADER | | | TCP/UDP HEADER | | | |
|---|---|---|---|---|---|---|---|---|---|
| SOURCE N.W. NODE-POINT ADD. (N-SA) | DES. N.W. NODE-POINT ADD. (N-DA) | OTHER | SOURCE TERM. ADD. (SA) | DES. TERM. ADD. (DA) | OTHER | SOURCE AP PORT No. (SP) | DES. AP PORT No. (DP) | OTHER | DATA FIELD |

← TRANSMITTED/RECEIVED IP PACKET BETWEEN TERMINALS →

← INTEGRATED IP N.W. PACKET →

FIG.6

| REQ. ID | SOURCE TERM. ADD. (SA) | DES. TERM. ADD. (DA) | PORT No. (P) | SOURCE N.W. NODE-POINT ADD. (N-SA) | DES. N.W. NODE-POINT ADD. (N-DA) | N.W. ID |
|---|---|---|---|---|---|---|
| 2 | A200 | A 100 | 300,500 | G 200 | G 100 | NWa (Video-net) |
| 3 | | | | G 210 | G 110 | NWc (IP-phone-net) |
| 2 | A200 | A 100 | 700 | G 225 | G 100 | NWb (General-net) |
| 2 | A200 | A 500 | 800 | G 230 | G 500 | NWb (General-net) |
| 3 | | | | G700 | G600 | NWd (Fax-net) |

FIG.8

| REQ. ID | SOURCE TERM. ADD. (SA) | DES. TERM. ADD. (DA) | SOURCE N.W. NODE-POINT ADD. (N-SA) | DES. N.W. NODE-POINT ADD. (N-DA) | N.W. ID |
|---|---|---|---|---|---|
| 2 | A 105 | A205 | G 105 | G 205 | NWa (Video-net) |
| 3 | | | G 115 | G 215 | NWc (IP-phone-net) |
| 2 | A 105 | A205 | G 125 | G 225 | NWb (General-net) |
| 2 | A 505 | A205 | G 505 | G 235 | NWb (General-net) |
| 3 | | | G605 | G705 | NWd (Fax-net) |

| SOURCE TERM. ADD. (SA) | DES. TERM. ADD. (DA) | PORT. No. (P) | SOURCE N.W. NODE-POINT ADD. (N-SA) | DES. N.W. NODE-POINT ADD. (N-DA) |
|---|---|---|---|---|
| A381 | A453 | 25 | G361 | G453 |
| A381 | A401 | 4000 | G361 | G366 |
| A382 | A451 | 25 | G361 | G451 |
| A382 | A432 | 3000 | G361 | G368 |
| A383 | A452 | 25 | G361 | G452 |
| A383 | A411 | | G361 | G3610 |
| A383 | A412 | | G361 | G3610 |
| A383 | A413 | | G361 | G3610 |
| A421 | A454 | 25 | G362 | G454 |
| A421 | A422 | 5000 | G362 | G367 |
| . . | . . | . . | . . | . . |
FIG.15
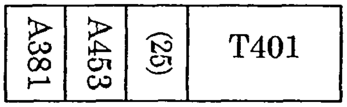
FIG.16
FIG.17
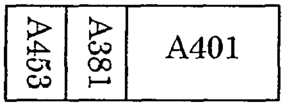
FIG.18
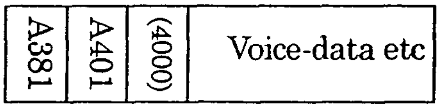
FIG.19
FIG.20

INTEGRATED IP NETWORK

CROSS-REFERENCE TO RELATED APPLICATIONS

This application is a division of U.S. patent application Ser. No. 09/568,515, filed on May 9, 2000, now U.S Pat. No. 6,711,623 which claims priority to Japanese Application No. 128956/1999, filed on May 10, 1999, and Japanese Application No. 13154/2000, filed on Jan. 21, 2000, the disclosure of which is incorporated herein by reference.

BACKGROUND OF THE INVENTION

1. Field of the Invention

The present invention relates to an integrated IP (Internet Protocol) network of an IP network for computer communication based on the TCP/IP (Transmission Control Protocol/Internet Protocol) technology.

2. Description of the Related Art

The IP network designed to send and receive digitized voice data according to the TCP/IP technology (hereinafter referred to as an "IP telephone network") uses a communication circuit speed of about 64 Kbps to keep the arrival time of voice data below, for example, 0.1 second. An IP telephone network to send and receive a compressed video image of TV according to the TCP/IP technology (hereinafter referred to as an "IP video network") uses a communication circuit speed of, for example, 1.5 Mbps and allows a video data arrival time of a few minutes.

The IP telephone network to transfer texts of electronic vouchers according to the TCP/IP technology (hereinafter referred to as an "IP electronic text network") has a communication circuit speed of about 128 Kbps to keep the data arrival time less than 1 second. In this case, because the reliability is given a greater importance than those of voice transmission and TV video transmission, the communication error occurrence rate is kept less than one one-hundredth those of the IP telephone network and IP video network.

Other IP telephone networks include, for example, an "IP data multicast network" that transfers IP data such as electronic books and electronic newspapers from one sending source to a plurality of destinations, and an "IP-based TV broadcast network," an IP audio-visual network, which transfers (or broadcasts) both TV's voice data and video data to a plurality of destinations using multicast technology, one of technologies. These multicast type network differ from the preceding IP telephone networks in that they do not employ the one-to-one communication scheme.

As shown in FIG. 1, in the conventional IP network 20 as represented by the Internet, an IP packet 26-1, including IP telephone data, IP video data and IP electronic voucher text data, is dispatched from a terminal 23-1 within a LAN 21 to a terminal 23-2 in a LAN 22 through a router 24-1 in the LAN 21 and routers 22-1 to 22-4 in the IP network 20 and through a router 24-2 in a LAN 22. The Internet, while it cannot guarantee the communication speed and others during the IP transfer, is generally called a "best effort network" in the sense that it makes the best effort. The IP telephone data, the IP video data and the IP electronic voucher text data flow in an intermingled manner through the communication circuits in the IP network 20, as in this example. That is, the conventional IP networks do not contain therein a plurality of separated IP networks with various characteristics, such as the IP telephone network and IP video network, the IP electronic text network, the best effort network, the IP data multicast network and the IP-based TV broadcast network.

For this reason and others, the IP telephone network, IP video network, IP electronic text network, best effort network, IP data multicast network and IP-based TV broadcast network have been constructed separately, giving rise to a problem of an increased overall cost of the entire IP network.

By referring to FIG. 2 a multicast type IP network 27-1 that transfers data from one originating source to multiple destinations will be explained. Reference numbers 27-2 to 27-9 represent routers, of which 27-2, 27-6, 27-7, 27-8 and 27-9 in particular are routers to which the users' IP terminals 28-1 to 28-9 can connect via communication circuits and which are also called network nodes. The routers 27-3, 27-4, 27-6, 27-7, 27-8 have a multicast-by-router table that tells each router to send a received IP packet to a plurality of communication circuits according to a multicast address contained in the received IP packet. In this embodiment, the multicast address specifies "MA1". The IP terminal 28-1 sends an IP packet 29-1 which has a multicast address "MA1" through the router 27-2. When it reaches the router 27-3, the router 27-3 copies the IP packet 29-2, checks the multicast-by-router table and transfers IP packet 29-3 and IP packet 29-4 onto communication circuits. The router 27-4 copies the received IP packet 29-3 and, according to the multicast-by-router table, transfers IP packet 29-5 and IP packet 29-6 onto communication circuits. The router 27-5 has no multicast-by-router table and so the IP packet 29-4 passes through the router 27-5 to be transferred as IP packet 29-7 to the router 27-8. The router 27-6 copies the received IP packet 29-5, checks the multicast-by-router table and transfers IP packet 29-8 to IP terminal 28-2 and IP packet 29-9 to IP terminal 28-3. The router 27-7 copies the received IP packet 29-6, references the multicast-by-router table and transfers IP packet 29-10 to IP terminal 28-4 and IP packet 29-11 to IP terminal 28-5. The router 27-8 copies the received IP packet 29-7, references the multicast-by-router table and sends the IP packet 29-12 to IP terminal 28-6, IP packet 29-13 to IP terminal 28-7 and IP packet 29-14 to IP terminal 28-8. When the source terminal 28-1 sends electronic books and electronic newspapers in a digital data format to the IP network 27-1, the IP network 27-1 functions as an IP data multicast network for distributing electronic books and electronic newspapers, with the IP terminals 28-2 to 28-8 representing IP terminals of the users purchasing the electronic books and electronic newspapers. When the source terminal 28-1 is replaced with a TV broadcast audio-visual transmission equipment and a TV program (i.e., voice and video) is broadcast, this IP network works as an IP-based TV broadcast network, with IP terminals 28-2 to 28-8 representing TV viewers' IP terminals with TV reception function.

SUMMARY OF THE INVENTION

The present invention has been accomplished under the above circumstances and the object of the invention is to provide an integrated IP network which contains separately a plurality of IP networks having various characteristics of, for example, IP telephone network, IP video network, IP electronic text network, best effort network, IP data multicast network, IP-based TV broadcast network or the like.

The present invention relates to an integrated IP network and the above object of the invention can be achieved by an integrated IP network including: a plurality of IP networks and a plurality of network node devices; wherein the network node devices are each connected to one or more of the IP networks via communication circuits and have their network node-points connected to external terminals via communication circuits; wherein, when the network node device receives an IP packet from the external terminal, the following sequence of operations is performed: in a first case where a network node-point address of the network node-point through which the received IP packet has passed is registered in an address management table as not specifying a virtual dedicated line connection, a source terminal address, a destination terminal address and a port number registered in the address management table are compared with a source terminal address, a destination terminal address, a source port number and a destination port number contained in the IP packet to find a record containing a network identifier indicating a destination IP network to which the IP packet is to be sent; in a second case where a network node-point address of the network node-point through which the received IP packet has passed is registered in the address management table as specifying a virtual leased line connection, a record containing a network identifier indicating a destination IP network to which the IP packet is to be sent is detected; after the procedure of the first case or the second case is completed, the source network node-point address and the destination network node-point address contained in the detected record are used to generate an integrated IP network packet which is then sent to the destination IP network; the integrated IP network packet passes through an IP packet exchange point and the destination IP network and reaches another network node device where an integrated IP network header is removed from the integrated IP network packet to restore the source IP packet which is then sent to a destination IP terminal; wherein the address management table is referenced to select a destination IP network to which the IP packet is to be transferred and the IP packet is sent to the destination IP network, and the integrated IP network packet is passed through two or more IP networks of different communication companies within the destination IP network and through IP packet exchange points.

Further the above object of the present invention can be achieved by an integrated IP network including: a plurality of IP networks and a plurality of network node devices; wherein the network node devices are each connected to one or more of the IP networks via communication circuits and have their network node-points connected to external terminals via communication circuits; wherein the IP networks each include a dedicated domain name server; the domain name servers each has a correspondence relationship between IP addresses of the external terminals and host names of the terminals; upon receiving from an external source terminal an IP packet whose destination is one of the domain name servers, the network node device transfers the received IP packet to the destination domain name server; the destination domain name server retrieves an IP address of a destination terminal corresponding to the host name of the destination terminal contained in the received IP packet and returns the IP packet containing the destination terminal's IP address obtained to the source terminal; the source terminal generates a new IP packet having the destination terminal's IP address obtained from the domain name server in the above procedure and sends the generated IP packet to the network node device; the network node device compares a source terminal address, a destination terminal address and a port number registered in the address management table with a source terminal address, a destination terminal address and a port number contained in the IP packet to find a record specifying a destination IP network to which the IP packet is to be sent, generates an integrated IP network packet by using the source network node-point address and the destination network node-point address contained in the detected record, and sends the generated integrated IP network packet to the destination IP network; and the integrated IP network packet passes through the IP network and the IP packet exchange point and reaches another network node device where an integrated IP network header is removed from the integrated IP network packet to restore the sending IP packet which is then sent to the destination IP terminal; wherein the address management table is referenced to select a destination IP network to which the IP packet is to be transferred and the IP packet is sent to the destination IP network, and the integrated IP network packet is passed through two or more IP networks of different communication companies within the destination IP network and through IP packet exchange points.

BRIEF DESCRIPTION OF THE DRAWINGS

In the accompanying drawings:

FIG. 5 is an address management table used in the first embodiment of the present invention;

FIG. 6 is an explanatory diagram of a packet to be transmitted and received in the first embodiment of the present invention;

FIG. 8 is another example of the address management table used in the first embodiment of the present invention;

FIG. 15 is a diagram showing an address management table used in the third embodiment;

FIG. 16 is an example of a "packet transmitted and received" which is used in the third embodiment;

FIG. 17 is an example of a "packet transmitted and received" which is used in the third embodiment;

FIG. 18 is an example of a "packet transmitted and received" which is used in the third embodiment;

FIG. 19 is an example of a "packet transmitted and received" which is used in the third embodiment;

FIG. 20 is an example of a "packet transmitted and received" which is used in the third embodiment;

DETAILED DESCRIPTION OF THE PREFERRED EMBODIMENTS

In the present invention, a plurality of IP networks having various characteristics of IP telephone network, IP video network, IP electronic text network, best effort network, IP data multicast network, IP-based TV broadcast network and others are virtually installed. An address management table is set in a network node device installed at an input point through which the integrated IP network is accessed from outside. Addresses of terminals and port numbers for identifying application programs (AP) contained in the terminals are registered in advance in the address management table. The address and port number written in the IP packet entered into the integrated IP network are compared with the addresses and port numbers registered in the address management table to route, inside the integrated IP network, the IP packet to an appropriate IP network. The port number may not be used and only the address compared.

Now, embodiments of the present invention will be described by referring to the accompanying drawings.

Figure 1:
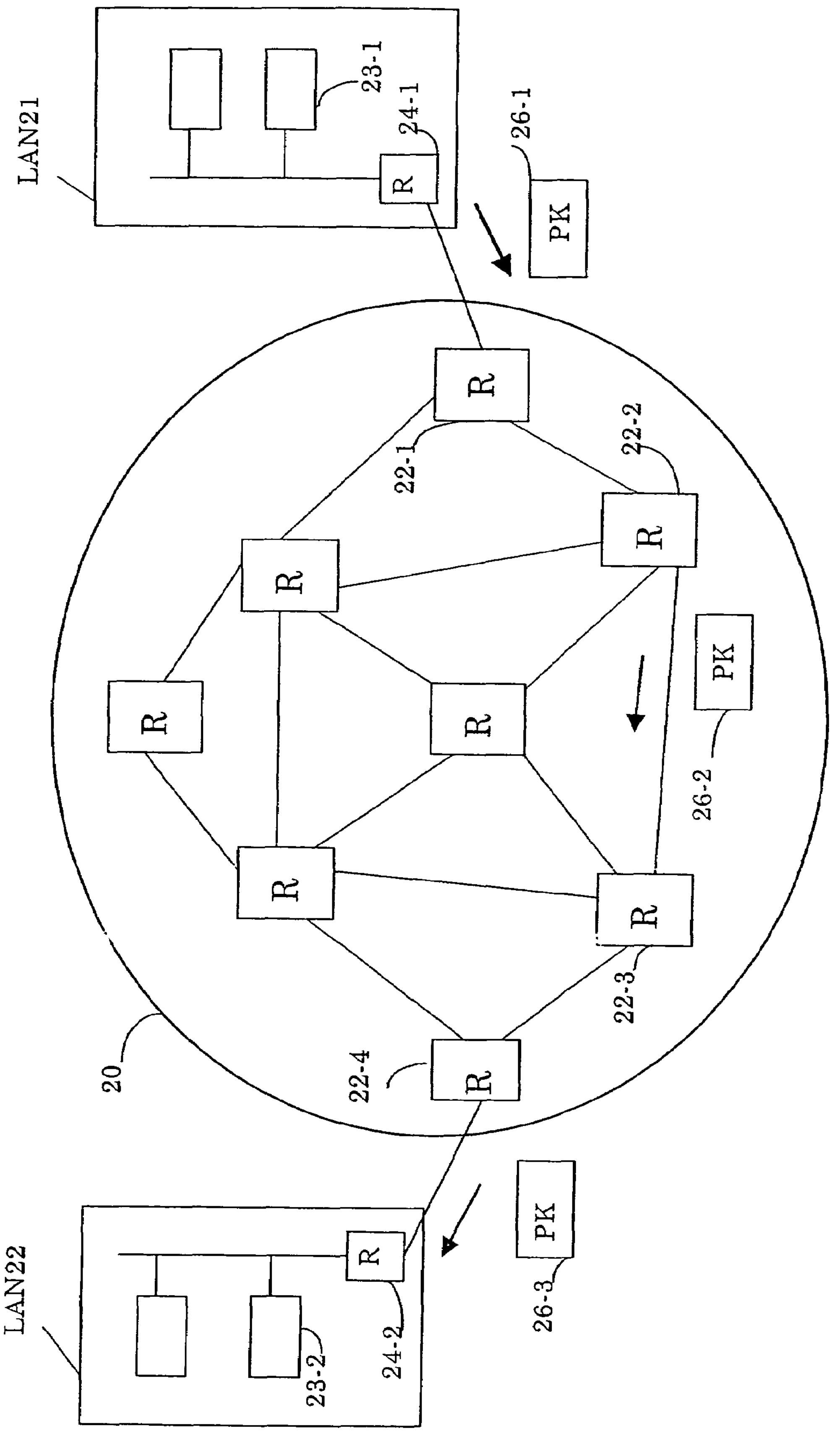
FIG. 1 is a conceptual diagram showing an IP transfer according to the conventional Internet.
Figure 2:
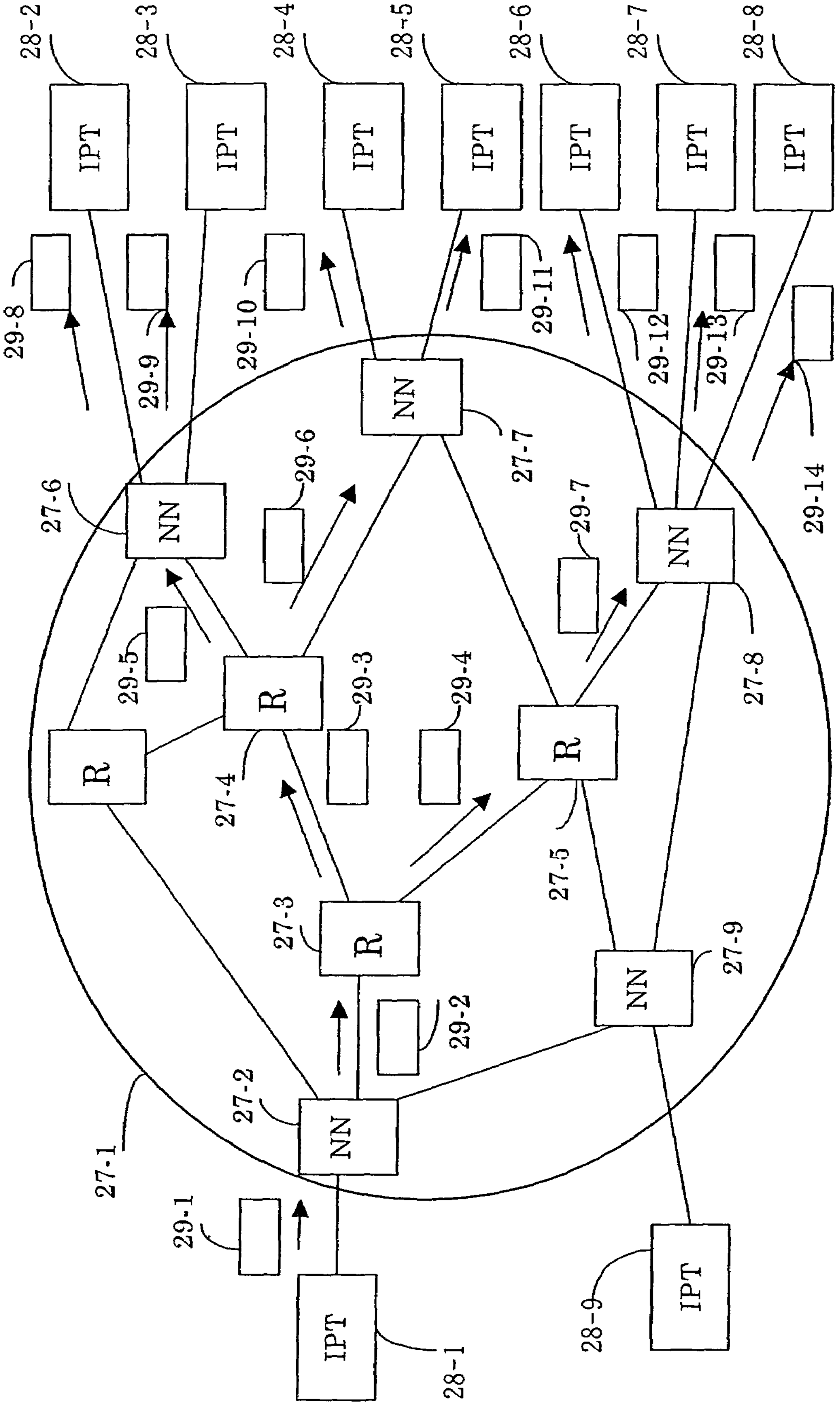
FIG. 2 is a conceptual diagram showing a multicast type IP transfer.
Figure 3:
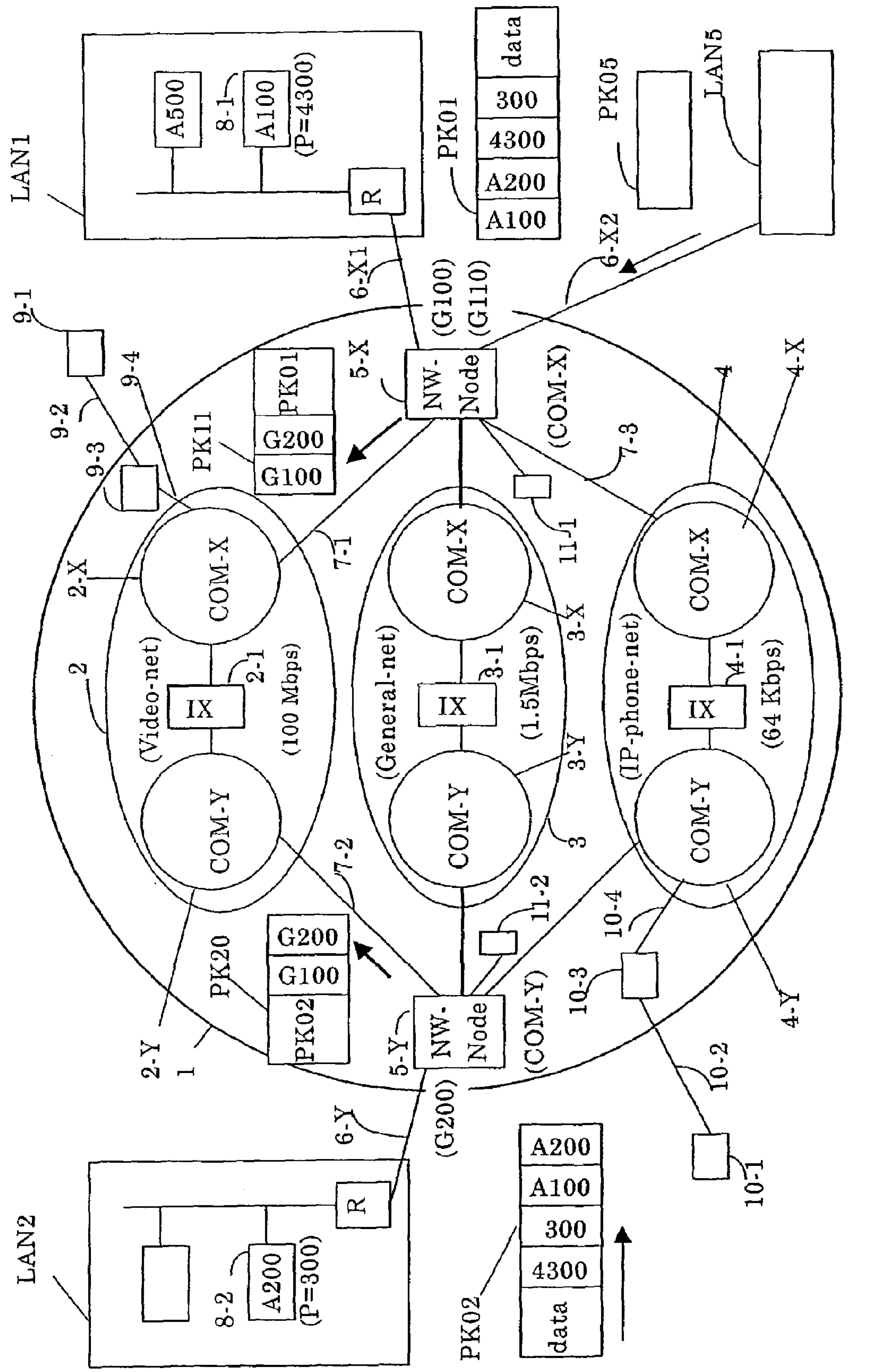
FIG. 3 is a schematic block diagram showing a first embodiment of the present invention.

1. First Embodiment in Which IP Network is Selected According to IP Address and Port Number:

In FIG. 3, an source terminal 8-1 in a LAN 1, for example, sends an. IP packet PK01 to a destination IP terminal 8-2 in a LAN 2 via an integrated IP network 1. Connecting points where communication circuits 6-X1 and 6-X2 connect to the network node device 5-X are called "network node-points". The network node-point (5-X) of the communication circuit 6-X1 is given a network node-point address "G100" used in the integrated IP network 1; the network node-point (5-X) of the communication circuit 6-X2 is assigned a network node-point address "G110"; and the network node-point (5-Y) of the communication circuit 6-Y is assigned a network node-point address "G200". The IP packet PK01 includes an address "A100" of the source terminal 8-1, an address "A200" of the destination terminal 8-2, a source port number "4300" (SP) for identifying the application program (AP) in the source terminal 8-1, a destination port number "300" (DP) for identifying the application program in the destination terminal 8-2, and data used by the application program.

The application programs include a voice telephone transmission/reception program, a video transmission/reception program, an electronic voucher transmission/reception program, and WWW (World Wide Web) data transmission/reception program based on HTTP (Hyper Text Transfer Protocol). The voice telephone transmission/reception program denotes a telephone transmission/reception program for IP telephone using digital technology. In this embodiment, the terminal address represents an IP address, the port number represents a port number set in a TCP (Transmission Control Protocol) type data block or UDP (User Datagram Protocol) type data block. In the present invention, the record in the address management table designates lines in the table and includes a plurality of data items.

In FIG. 3, denoted 2 is an IP video network which includes an IP video network 2-X of a communication company X and an IP video network 2-Y of a communication company Y connected together at an IP packet exchange point 2-1. Denoted 3 is an IP general purpose network which includes an IP general purpose network 3-X of the communication company X and an IP general purpose network 3-Y of the communication company Y connected together at an IP packet exchange point 3-1. Reference numeral 4 is an IP telephone network which includes an IP telephone network 4-X of the communication company X and an IP telephone network 4-Y of the communication company Y connected together at an IP packet exchange point 4-1. The integrated IP network 1 comprises the IP video network 2, the IP general purpose network 3 and the IP telephone network 4. Further, the network node device 5-X is connected with an address management table rewriting device 11-1, and the network node device 5-Y is connected with an address management table rewriting device 11-2. The address management table rewriting devices 11-1 and 11-2 can write address and port number into the address management tables in the network node devices 5-X and 5-Y.

Figure 4:
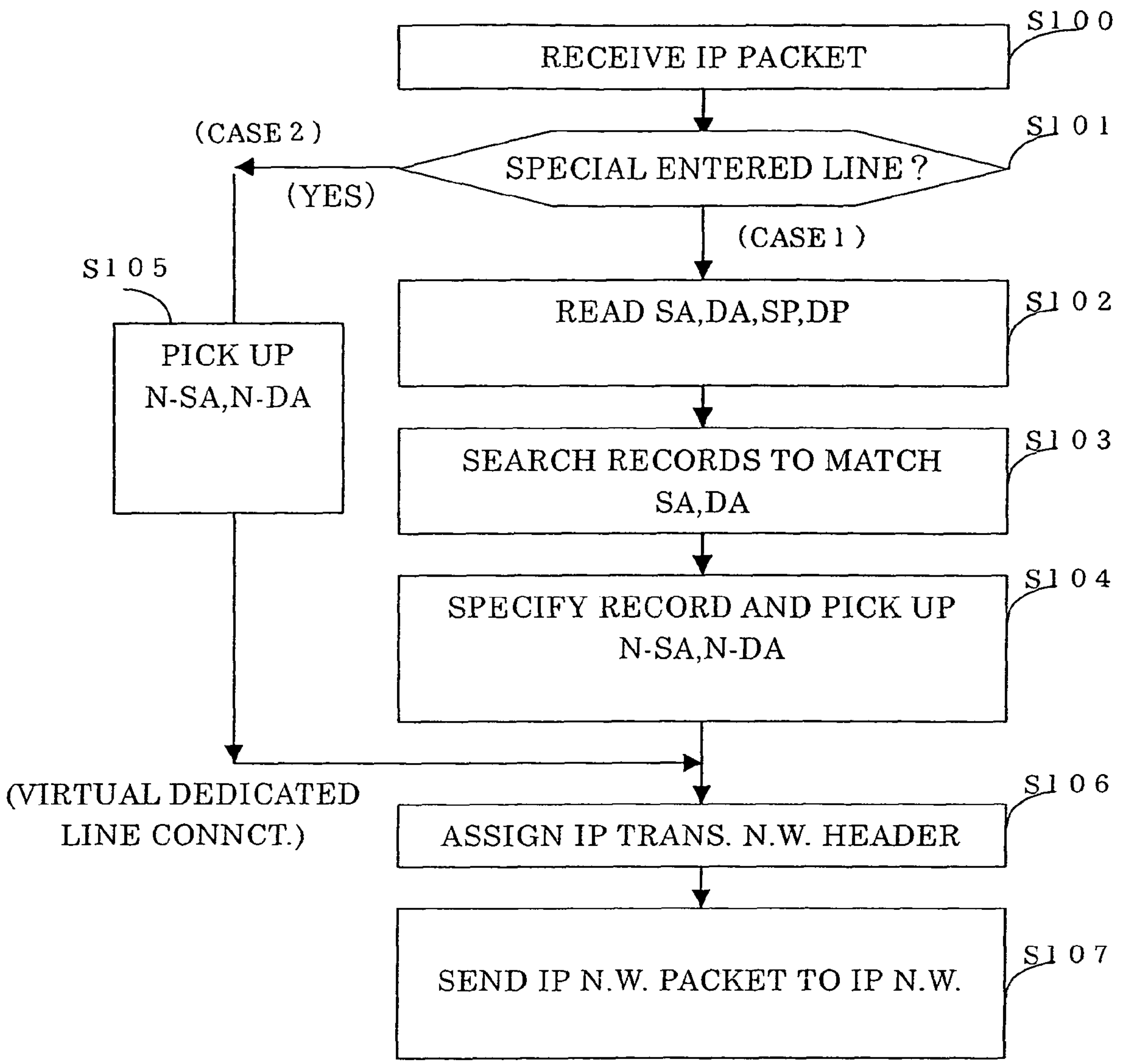
FIG. 4 is a flow chart showing an example operation performed by a network node device of the first embodiment of the present invention.

In this configuration, the operation of the network will be explained by referring to a flow chart of FIG. 4. FIG. 4 is a flow chart showing an example operation of the network node device 5-X. First, an IP packet PK01 is entered into the network from the communication circuit 6-X1 via a network node-point assigned a network node-point address "G100." Upon receiving the IP packet PK01 (Step S100), the network node device 5-X searches through a "source network node-point address" column in the address management table of FIG. 5 contained in the device to see if there is any registered record which has the network node-point address of "G100" and checks if the record's request identification value is "3" (Step S101). In this embodiment, the request identification value is not "3", which means that this packet does not specify what is called a virtual dedicated line connection (Case 1). The network node device 5-X then reads from the IP packet PK01 the address "A100" (SA) of the source terminal 8-1, the address "A200" (DA) of the destination terminal 8-2, the source port number "4300" (SP) for identifying the application program in the source terminal 8-1, and the destination port number "300" (DP) for identifying the application program in the destination terminal 8-2 (Step S102). The network node device 5-X then searches through the address management table set in the device to search records whose addresses match the source terminal address "A100" (SA) and the destination terminal address "A200" (DA) of the packet (Step S103). It should be noted that normally there are two or more records that satisfy this condition.

Next, because among the extracted records there is one record which has either the source port number "4300" (SP) or the destination port number "300" (DP), it is searched and identified (Step S104). In this embodiment, this record is found at the first line, from the top, in the address management table of FIG. 5, which has "SA=A100, DA=A200, P=300, N-SA=G100, N-DA=G200" and a network identifier of NWa (Video-net)." From this record, the device picks up the source network node-point address "G100" and the destination network node-point address "G200" and the processing moves to step S106. The network node-point address may use the IP address mentioned above. That is, it may use an address applied to a third layer of OSI (Open Systems Interconnection), or it may use an address applied to a second layer of the OSI, for example, an address used in a FR (Frame Relay) exchange and an ATM (Asynchronous Transfer Mode) exchange (e.g., telephone number according to E.164 specification).

In the above Step S100, if other IP packet PK05 is entered into the network from the communication circuit 6-X2 through a network node-point assigned a network node-point address "G110", the network node device 5-X receives the IP packet PK05, searches through the address management table in the device to see if there is any record which has a network node-point address of "G110" in the "source network node-point address" column in the table and also checks whether the "request identification" value of the record is "3" or not (Step S101). In this embodiment, this record has a "request identification" value of "3" (at the second line, from the top, in the address management table), which means that the packet specifies what is called a virtual dedicated line connection (Case 2). Thus, the processing proceeds to Step S105. Then the device retrieves the source network node-point address "G110" and the destination network node-point address "G210" registered in this particular record, before moving to Step S106.

Next, the device adds an integrated IP network header shown in FIG. 6 to the packet to generate an integrated IP network packet PK11 (Step S106). This step uses the source network node-point address "G100" or "G110" (N-SA) and the destination network node-point address "G200" or "G210" (N-DA) obtained in Step S104 or Step S105. Next, the integrated IP network packet PK11 generated by the above procedure is sent out on a communication circuit 7-1 according to the specified network identifier "NWa" (IP video network) (Step S107). This communication circuit 7-1 is connected to the IP video network 2-X run by the communication company X within the IP video network 2.

The above Step S105 switches between the IP telephone network and the IP general purpose network according to whether the received IP packet PK01 specifies "NWc" (IP telephone network) or "NWb" (IP general purpose network) as the network identifier.

Figure 7:
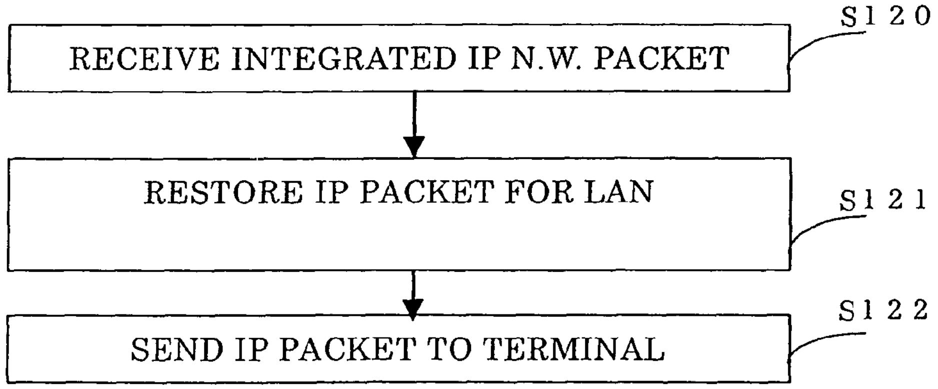
FIG. 7 is a flow chart showing another example of operation performed by the network node device of the first embodiment of the present invention.

Next, the integrated IP network packet PK11 is sent across the IP video network 2-X, passed through an IP packet exchange point 2-1 and sent across the IP video network 2-Y of the communication company Y to reach the network node device 5-Y. The network node device 5-Y, as shown in the flow chart of FIG. 7, first receives the integrated IP network packet PK11 (Step S120), removes the IP network header from the received integrated IP network packet to restore the IP packet destined for LAN (Step S121), and sends the restored IP packet through the communication circuit 6-Y to the terminal 8-2 (Step S122).

When the terminal 8-2 in LAN 2 sends out another IP packet PK02 in a direction opposite to that in which the IP packet PK11 was transmitted, the address and the port number in the IP packet are reversed in order from those of the former IP packet. That is, the IP packet has the source terminal address of "A200," the destination terminal address of "A100", the source port number of "300" for identifying the application program in the source terminal, and the destination port number of "4300" for identifying the application program in the destination terminal. In this case, an address management table shown in FIG. 8 is used and the port selection specification is also reversed.

The IP packet exchange point 2-1 measures the number of IP packets passing through this point and the length of time taken by the IP packets to pass through the point. The communication company X managing the IP video network 2-X and the communication company Y managing the IP video network 2-Y can measure and use the number and time of the passing IP packets as data for calculating the communication charges to the IP packet senders and receivers. It is also possible to implement this embodiment such that the IP video network 2-Y of the communication company Y and the IP packet exchange point 2-1 do not exist, i.e., the IP video network 2 includes only the IP video network 2-X of the communication company X. In this case, the communication company running the IP video network 2 is one company "X". Similarly, the IP telephone network 4 may include only the IP telephone network 4-X of the communication company X.

Next, let us explain about a case where the terminals are video transmission/reception device or IP telephones, and the communication circuit connected to the logic terminals of network node devices is connected solely to the IP video network 2-X or IP telephone network 4-Y. In FIG. 3, a reference numeral 9-1 is a video transmission/reception device which is connected to the network node device 9-3 via a communication circuit 9-2 and further to the IP video network 2-X via a communication circuit 9-4. A reference numeral 10-1 is an IP telephone which is connected to a network node device 10-3 via a communication circuit 10-2 and further to an IP telephone network 4-Y via a communication circuit 10-4. The communication company X is running the network node device 9-3 and the communication company Y the network node device 10-3. The address management table prepared according to the same principle as that of FIG. 5 or 8 is set in the network node devices 9-3 and 10-3.

In this configuration, an IP packet including video information transmitted from the video transmission/reception device 9-1 as digital information, for example, can exchange the video digital information with the video transmission/reception program in the terminal 8-2 via the network node device 9-3, the IP video network 2-X, the IP packet exchange point 2-1, the IP video network 2-Y, the network node device 5-Y and the communication circuit 6-Y. Likewise, an IP packet including voice information transmitted from the IP telephone 10-1 as digital data can exchange the voice digital information with the telephone transmission/reception program in the terminal 8-1 via the network node device 10-3, the IP telephone network 4-Y, the IP packet exchange point 4-1, the IP telephone network 4-X, the network node device 5-X and the communication circuit 6-X1.

In the first embodiment described above, the IP network has been described to include the IP telephone network and the IP video network. The dedicated IP networks may also be provided separately for different purposes, for example, IP facsimile network dedicated to facsimile, IP electronic voucher network dedicated to dealing with electronic voucher, and IP foreign exchange network dedicated to dealing with foreign exchange.

Figure 9:
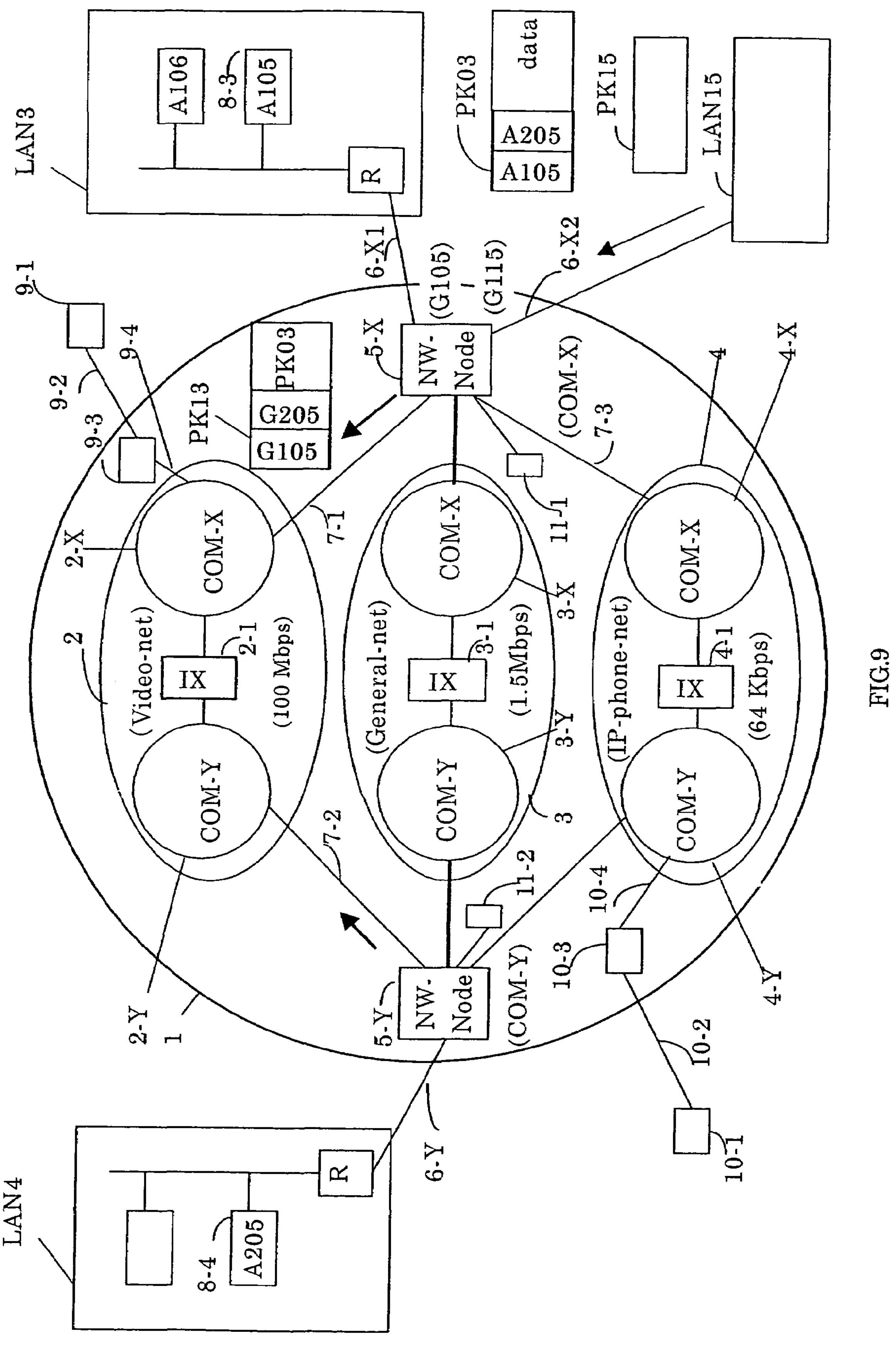
FIG. 9 is a schematic block diagram showing a second embodiment of the present invention.

2. Second Embodiment in Which IP Network is Selected According to Only IP Address:

As shown in FIG. 9 similar to FIG. 3, a network node-point of a communication circuit 6-X1 is given a network node-point address "G105" used in the integrated IP network; and a network node-point of a communication circuit 6-X2 is assigned a network node-point address "G115". An source terminal 8-3 in LAN 3, for example, sends an IP packet PK03 to a destination terminal 8-4 in LAN 4. The IP packet PK03 includes an address "A105" of the source terminal 8-3, an address "A205" of the destination terminal 8-4, and transmission data. The transmission data is data handled by a voice telephone transmission/reception program, a video transmission/reception program, an electronic voucher transmission/reception program, and a WWW data transmission/reception program based on the known HTTP protocol. The voice telephone transmission/reception program denotes a telephone transmission/reception program for IP telephone using digital technology.

Figure 10:
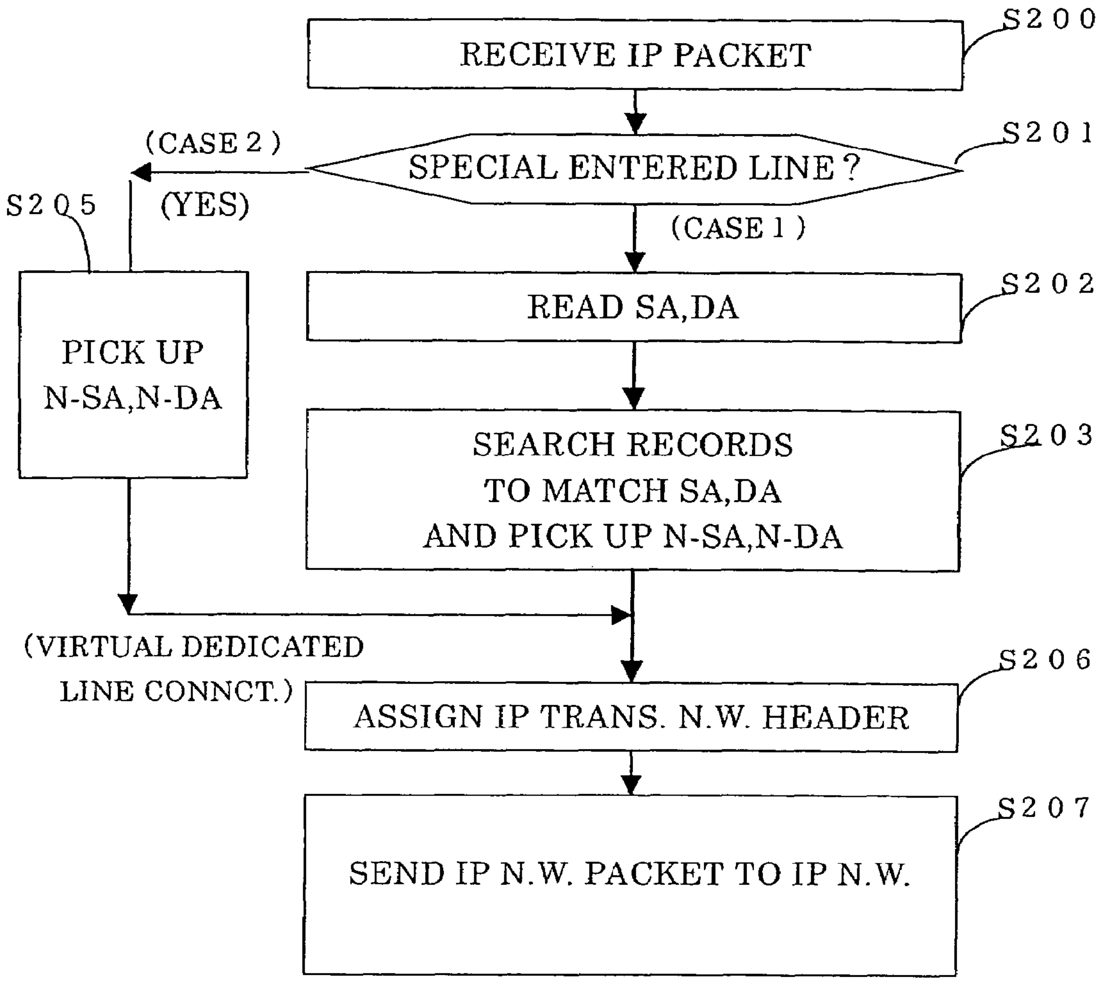
FIG. 10 is a flow chart of an example operation performed by a network node device of the second embodiment of the present invention.

In this configuration, the operation of the network will be explained by referring to a flow chart of FIG. 10. First, an IP packet PK03 is entered into the network from the communication circuit 6-X1 via a network node-point assigned a network node-point address "G105". The network node device 5-X receives the IP packet PK03 (Step S200), searches through the address management table in the device to see if there is any registered record which has the network node-point address of "G105" in "the source network node-point address" column, and checks if the record's request identification value is "3" (Step S201). In this embodiment, the request identification value is not "3", which means that this packet does not specify the virtual dedicated line connection (Case 1). The network node device 5-X then reads from the IP packet PK03 the address "A105" (SA) of the source terminal 8-3 and the address "A205" (DA) of the destination terminal 8-4 (Step S202) and searches through the address management table set in the device and shown in FIG. 11 to find a record whose addresses match the source terminal address "A105" (SA) and the destination terminal address "A205" (DA) of the packet (Step S203). In this embodiment, this record is found at the first line, from the top, in the address management table of FIG. 11, which has "SA=A105, DA=A205, N-SA=G105, N-DA=G205" and a network identifier of NWa (Video-net). From this record, the device picks up the source network node-point address "G105" and the destination network node-point address "G205" and the processing moves to Step S206. The network node-point address may use the IP address mentioned above. That is, it may use an address applied to a third layer of the OSI, or it may use an address applied to a second layer of the OSI, for example, an address used in an FR exchange and an ATM exchange (e.g., telephone number according to E.164 specification).

In the above Step S200, if other IP packet PK15 is entered into the network from the communication circuit 6-X2 through a network node-point assigned a network node-point address "G115 ", the network node device 5-X receives the IP packet PK15, searches through the address management table in the device to see if there is any record which has a network node-point address of "G115" in the "source network node-point address" column in the table and also checks whether the request identification value of the record is "3" or not (Step S201). In this embodiment, this record has a request identification value of "3" (at the second line, from the top, in the address management table), which means that the packet specifies the virtual dedicated line connection (Case 2). Thus, the processing proceeds to Step S205. Then the device retrieves the source network node-point address "G115" and the destination network node-point address "G215" registered in this particular record, before moving to Step S206.

Figures 11, 12:
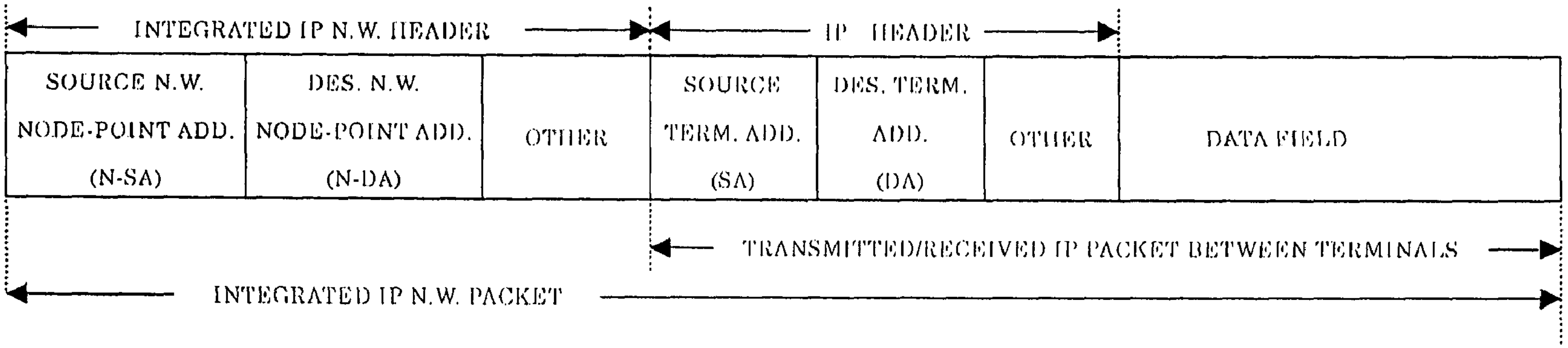
FIG. 11 is an example of address management table used in the second embodiment of the present invention.
FIG. 12 is an explanatory view of a packet transmitted and received in the second embodiment of the present invention.

Next, the device adds an integrated IP network header shown in FIG. 12 to the packet to generate an integrated IP network packet PK13 (Step S206). This step uses the source network node-point address "G105" or "G115" (N-SA) and the destination network node-point address "G205" or "G215" (N-DA) obtained by Step S203 or Step S205. Next, the integrated IP network packet PK13 generated by the above procedure is sent out on a communication circuit 7-1 according to the specified network identifier "NWa" (IP video network) (Step S207). This communication circuit 7-1 is connected to the IP video network 2-X run by the communication company X within the IP video network 2. The above Step S205 switches between the IP video network and the IP general purpose network according to whether the received IP packet PK03 specifies "NWc" (IP telephone network) or "NWb" (IP general purpose network) as the network identifier.

Figure 13:
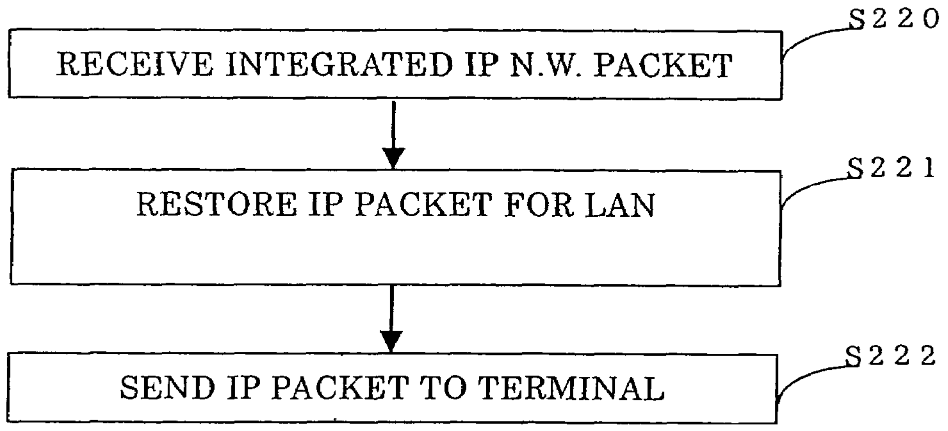
FIG. 13 is a flow chart showing another example of operation performed by the network node device of the second embodiment of the present invention.

Next, the integrated IP network packet PK13 is sent across the IP video network 2-X, passed through the IP packet exchange point 2-1 and sent across the IP video network 2-Y of the communication company Y to reach the network node device 5-Y. The network node device 5-Y, as shown in the flow chart of FIG. 13, receives the integrated IP network packet PK13 (Step S220), removes the IP header from the received integrated IP network packet to restore the IP packet destined for LAN (Step S221), and sends -the restored IP packet through the communication circuit 6-Y to the terminal 8-4 (Step S222). The IP packet exchange point 2-1 measures the number of IP packets passing through this point and the length of time taken by the IP packets to pass through the point. The communication company X managing the IP video network 2-X and the communication company Y managing the IP video network 2-Y can measure and use the number and time of the passing IP packets as data on which to base the calculation of the communication charges to the IP packet senders and receivers.

It is also possible to implement the second embodiment such that the IP video network 2-Y of the communication company Y and the IP packet exchange point 2-1 do not exist, i.e., the IP video network 2 includes only the IP video network 2-X of the communication company X. In this case, the communication company running the IP video network 2 is one company "X". Similarly, the IP telephone network 4 may include only the IP telephone network 4-X of the communication company X.

Figure 14:
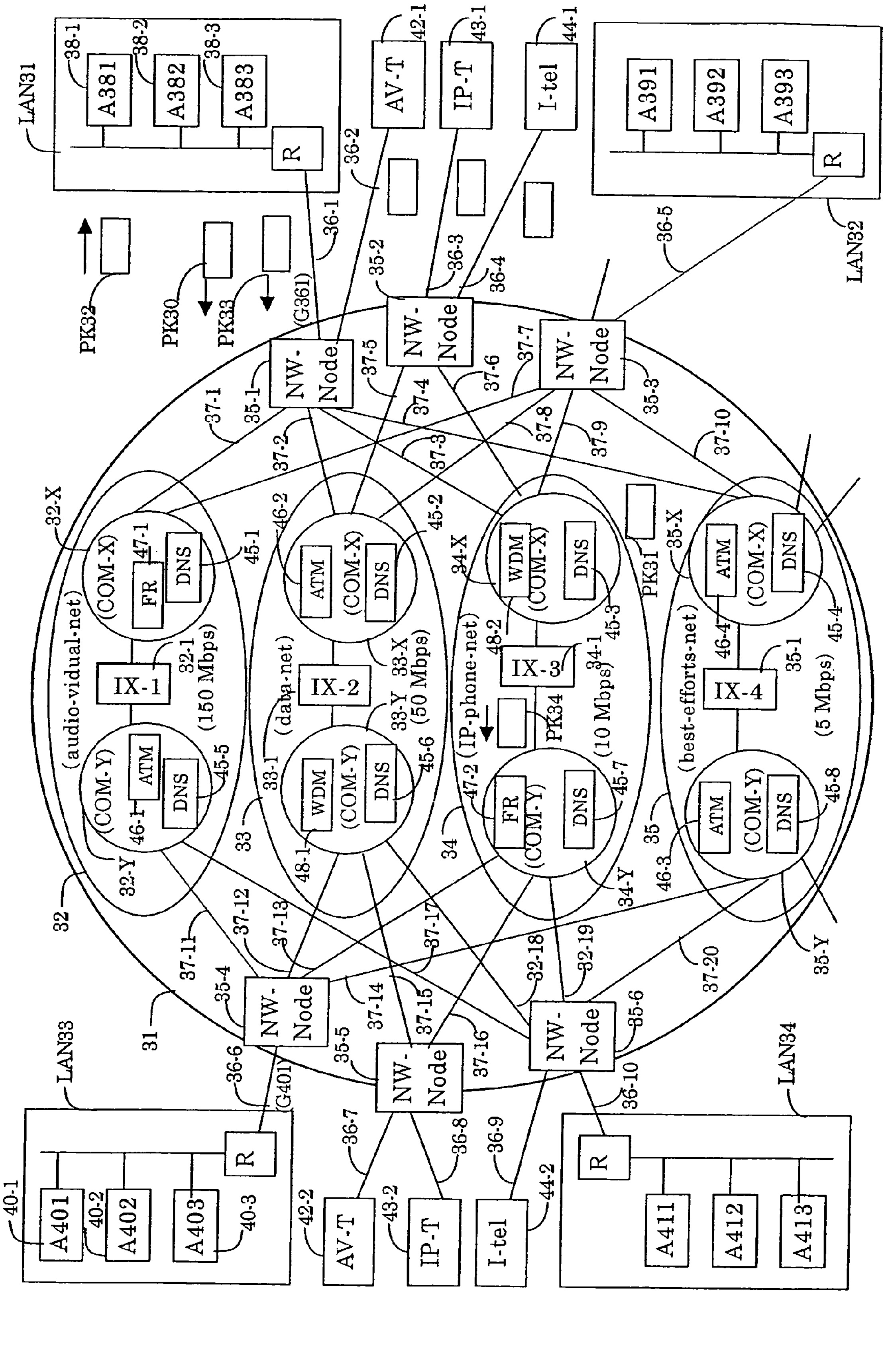
FIG. 14 is a schematic block diagram showing a third embodiment of the present invention.
Figure 21:
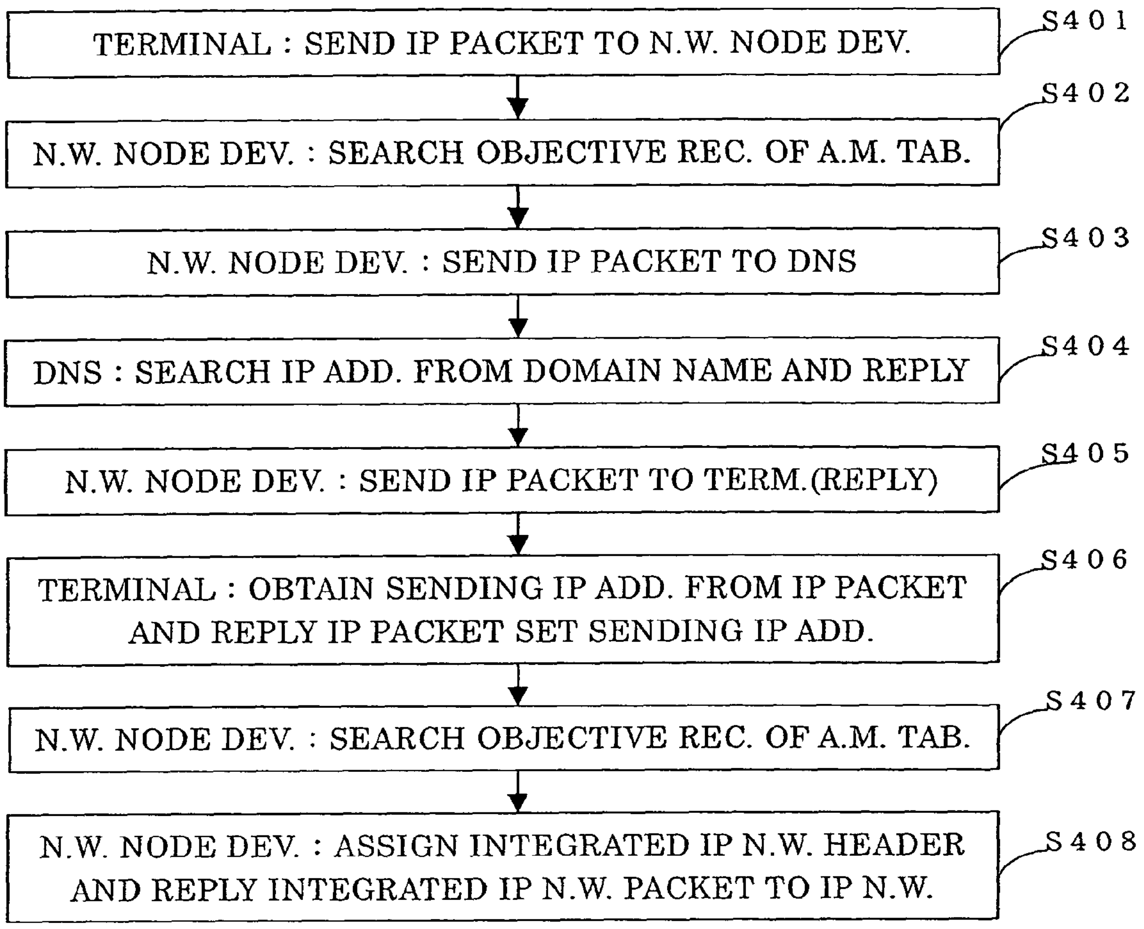
FIG. 21 is a flow chart showing an example operation performed by the network node device of the third embodiment.
Figure 22:
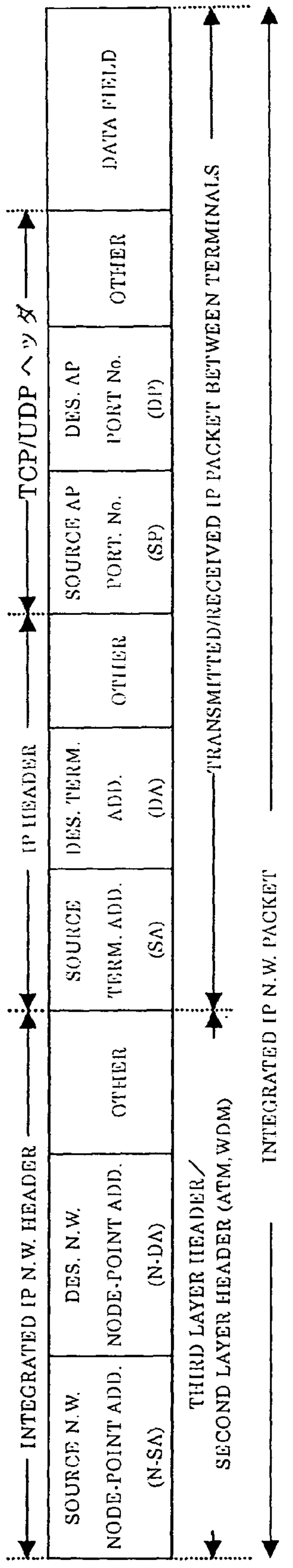
FIG. 22 is a diagram showing an IP packet used in the third embodiment.
Figure 23:
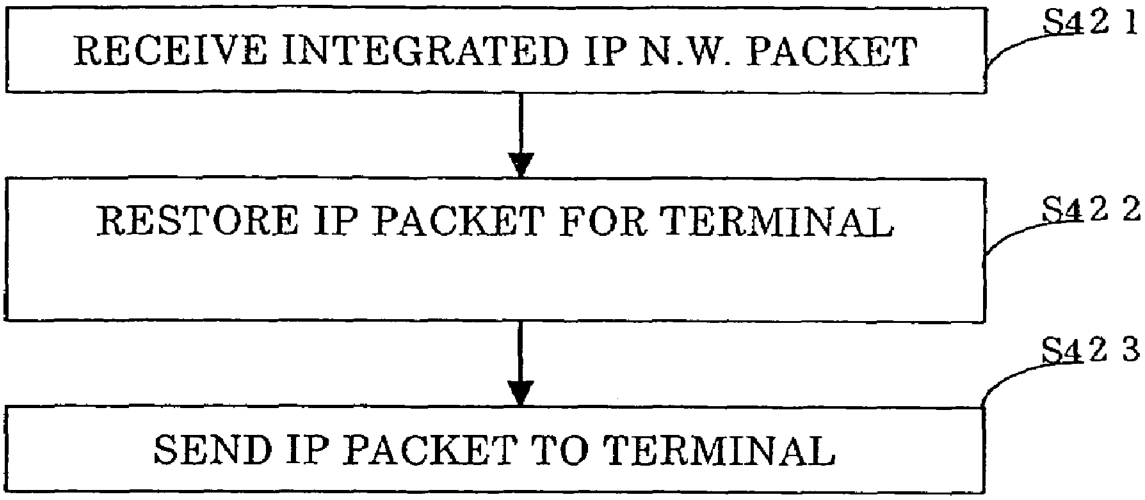
FIG. 23 is a flow chart showing another example of operation performed by the network node device of the third embodiment.

3. Third Embodiment Using Individual Domain Name Server:

As shown in FIG. 14, an integrated IP network 31 has an IP audio-visual network 32, an IP data network 33, an IP telephone network 34 and a best effort network 35. The IP audio-visual network 32 is an IP network similar to the IP video network but can transfer both video and its associated voice, such as movie and TV broadcast video and its voice. The IP data network 33 has a function similar to that of the IP electronic text network and can send such data as compressed static image data in addition to the electronic text data made up of characters. The best effort network 35 has a function of performing IP telephone communication, IP audio-visual communication and IP data communication and is an IP network that is used by a user who knows that in the event of a communication traffic congestion during IP transfer, communication delays will occur or the number of IP packets discarded will increase. A typical example of the IP best effort network is the Internet.

In the integrated IP network 31, network node devices 35-1, 35-2, 35-3, 35-4, 35-5 and 35-6 are connected to one of IP networks 31 (IP audio-visual network 32, IP data network 33, IP telephone network 34 and best effort network 35) through communication circuits 37-1 to 37-20. The network node-points of the network node devices are connected to external terminals 42-1, 43-1, 44-1, 42-2, 43-2, 44-2 of the integrated IP network 31 and internal terminals of LAN 31, LAN 32, LAN 33 and LAN 34 via one of communication circuits 36-1, 36-2, 36-3, 36-4, 36-5, 36-6, 36-7, 36-8, 36-9, 36-10. The network node devices each have an address management table which is written with IP addresses of registered terminals and port numbers for identifying the applications of the terminals.

The IP networks 31 (IP audio-visual network 32, IP data network 33, IP telephone network 34 and best effort network 35) include dedicated domain name servers 45-1, 45-2, 45-3, 45-4, 45-5, 45-6, 45-7, 45-8 used in these networks. These domain name servers have one-to-one correspondence between host names assigned to the external terminals 42-1 to 44-2 and their IP addresses.

The network node-point of the communication circuit 36-1 is given a network node-point address "G361" used within the integrated IP network 31. The network node-points represent logical boundaries between the network node devices 35-1 to 35-6 and the external communication circuits of the integrated IP network 31. The network node-points are each assigned a network node-point address. Further, the network node-point of the communication circuit 36-2 is assigned a network node-point address "G362", the network node-point of the communication circuit 36-6 is assigned a network node-point address "G366", the network node-point of the communication circuit 36-7 is assigned a network node-point address "G367", the network node-point of the communication circuit 36-8 is assigned a network node-point address "G368", and the network node-point of the communication circuit 36-10 is assigned a network node-point address "G3610".

FIG. 15 shows an example of the address management table in the network node device 35-1. The domain name server is assigned a network node-point address and an IP address, which are used as an address for sending and receiving IP packets.

Next, the method of communicating from an IP telephone 38-1 in LAN 31 to an IP telephone 40-1 in LAN 33, for example, will be explained by referring to FIGS. 15 to 23. The IP telephone 38-1 has an IP address of "A381" and the IP telephone 40-1 has a telephone number of "T401" corresponding to the host name of a terminal and an IP address of "A401". The domain name server 45-3 dedicated for the IP telephone network 34 has an IP address of "A453" and a network node-point address of "G453".

The IP telephone 38-1 first sends to a network node device 35-1 an IP packet PK36 containing the telephone number "T401" of the destination terminal or destination IP telephone 40-1 (Step S401). The network node device 35-1 reads from the received IP packet PK30 the address "A381" (SA) of the source IP telephone 38-1, the IP address "A453" (DA) of the destination domain name server 45-3 and a port number "25" and then searches through the address management table (FIG. 15) set in the network node device 35-1 to find a record whose addresses and port number match the address "A381" (SA) of the source IP telephone 38-1, the address "A453" (DA) of the destination domain name server 45-3 and the port number "25" (Step S402). In this example, this record is found at the first line, from the top, in the address management table of FIG. 15, which has "SA=A381, DA=A453, N-SA=G361, N-DA=G453". From this record, the device picks up the source network node-point address "G361" and the destination network node-point address "G453", adds an integrated IP network header to the packet to generate an IP packet PK31, and transfers the PK31 to the domain name server 45-3 (Step S403).

The domain name server 45-3 receives the IP packet PK31, searches through the internal database and sends back an IP address "A401" that has a one-to-one correspondence with the telephone number "T401" of the destination IP telephone 40-1. The network node device 35-1 returns the IP packet 32 to the IP telephone 38-1 (Step S405). With the above procedure, the IP telephone 38-1 obtains the IP address "A401" that has a one-to-one correspondence with the destination telephone number "T401".

Next, the IP telephone 38-1 generates a "terminal-to-terminal IP packet PK33" which includes the IP address "A381" of the source IP telephone 38-1, the IP address "A401" of the destination telephone, and voice that is digitized and stored in a payload section (data field) of the IP packet. The IP telephone 38-1 sends this packet on the communication circuit 36-1 (Step S406). Upon receiving the IP packet PK33, the network node device 35-1 reads from the packet the address "A381" (SA) of the source IP telephone 38-1, the address "A401" (DA) of the destination IP telephone 40-1, and a port number "4000" and then searches through the address management table (FIG. 15) set in the device to find a record whose addresses and port number match the address "A381" (SA) of the source IP telephone 38-1, the destination terminal address "A401" (DA) of the destination IP telephone 40-1 and the port number "4000" (Step S407). In this example, this record is found at the second line, from the top, in the address management table of FIG. 15, which has "SA=A381, DA=A401, port number=4000, NSA=G361, N-DA=G366". From this record, the device picks up the source network node-point address "G361" and the destination network node-point address "G366", adds an integrated IP network header to the packet to generate an integrated IP network packet PK34, and transfers the PK34 to the IP telephone network 34-X (Step S408).

The packet PK34 passes through a packet exchange point 34-1 and an IP telephone network 34-Y. The network node device 35-4 receives the IP packet PK34 (Step S421), removes the header from the received packet PK34 to restore the IP packet PK33 (Step S422), and sends the IP packet PK33 to the telephone 40-1 (Step S423). In Step S407 the two kinds of IP addresses and the port number were used for comparison. Some records in the address management table, however, are not written with their port numbers. In that case, the port number comparison may be omitted and only two kinds of IP addresses may be checked.

The network node-point address may be implemented as an IP address applied to a third layer of the OSI, as described above. Further, it may be implemented as an address applied to a second layer of the OSI, for example, an address used in the field of FR exchange and ATM exchange (such as telephone numbers according to E.164 specification), or it may be implemented by using a two-layer protocol based on WDM technology. When an address applied to the second layer is used, the "integrated IP network header" shown in FIG. 22 uses a header based on two-layer communication protocol, such as ATM and WDM.

Figure 24:
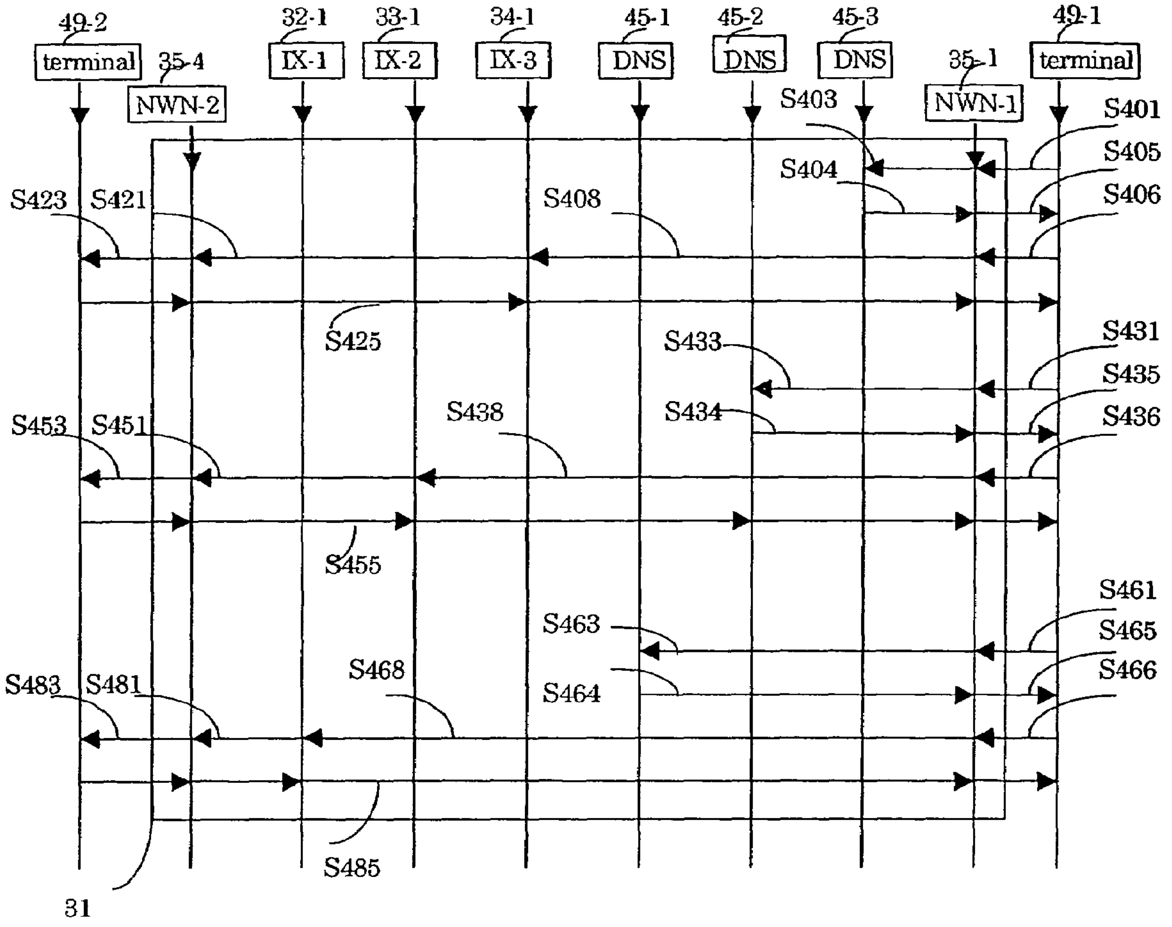
FIG. 24 is a timing chart showing another example of operation performed by the network node device of the third embodiment.

Next, further explanation will be given by referring to a timing chart of FIG. 24. In FIG. 24, reference numerals 49-1 and 49-2 represent terminals of various kinds installed outside the integrated IP network 31. The IP packet is sent from the terminal 49-1 to the network node device 35-1 (Step S401), from which it is transferred to the domain name server 45-3 dedicated for the IP telephone network 34 (Step S403). Then, the packet is returned from the domain name server (Steps S404 and S405). The terminal 49-1 sends the IP packet to the network node device 35-1 (Step S406), and the network node device 35-1 sends it to the integrated IP packet network (Step S408). The packet passes through the packet exchange point 34-1 of the IP telephone network 34 and is received by the other network node device 35-4 (Step S421), which in turn transfers the IP packet to the terminal 49-2 (Step S423). The terminal 49-2 can send back the IP packet to the terminal 49-1 (Step S425).

The step of sending and receiving the IP packet, i.e., from Step S431 to Step S455 shown in FIG. 24, can be achieved by using the IP data network 33. That is, the data can be transferred between the terminal 49-1 and the terminal 492 via the domain name server 45-2 dedicated for the IP data network 33 and the packet exchange point 33-1 in the IP data network 33. Further, the step of transferring the IP packet, i.e., Steps S461 to step 485 shown in FIG. 24, can be achieved by using the IP audio-visual network 32. That is, the data can be transmitted and received between the terminal 49-1 and the terminal 49-2 via the domain name server 45-1 dedicated for the IP audio-visual network 32 and the packet exchange point 32-1 in the IP audio-visual network 32.

In the above explanation, it is possible to implement this embodiment such that the IP audio-visual network 32-Y of the communication company Y and the IP packet exchange point 32-1 do not exit, i.e., the IP audio-visual network 32 includes only the IP audio-visual network 32-X of the communication company X. In that case, the communication company running the IP audio-visual network 32 is one company "X". Similarly, the IP data network 33 may include only the IP data network 33-X of the communication company X, and the IP telephone network 34 may include only the IP telephone network 34-X of the communication company X. Further, the best effort network 35 may include only the IP telephone network 35-X of the communication company X.

In FIG. 14, reference numerals 46-1, 46-2, 46-3 and 46-4 represent ATM exchange networks, 47-1 and 47-2 FR communication networks, and 48-1 and 48-2 optical communication networks. They are used in the IP network as high-speed trunk line networks to transfer IP packets. These networks employ, for example, technologies generally called "FR network-applied IP transfer" (IP over FR), "ATM network-applied IP transfer" (IP over ATM), and "Optical communication network-applied IP transfer" (IP over WDM).

Figure 25:
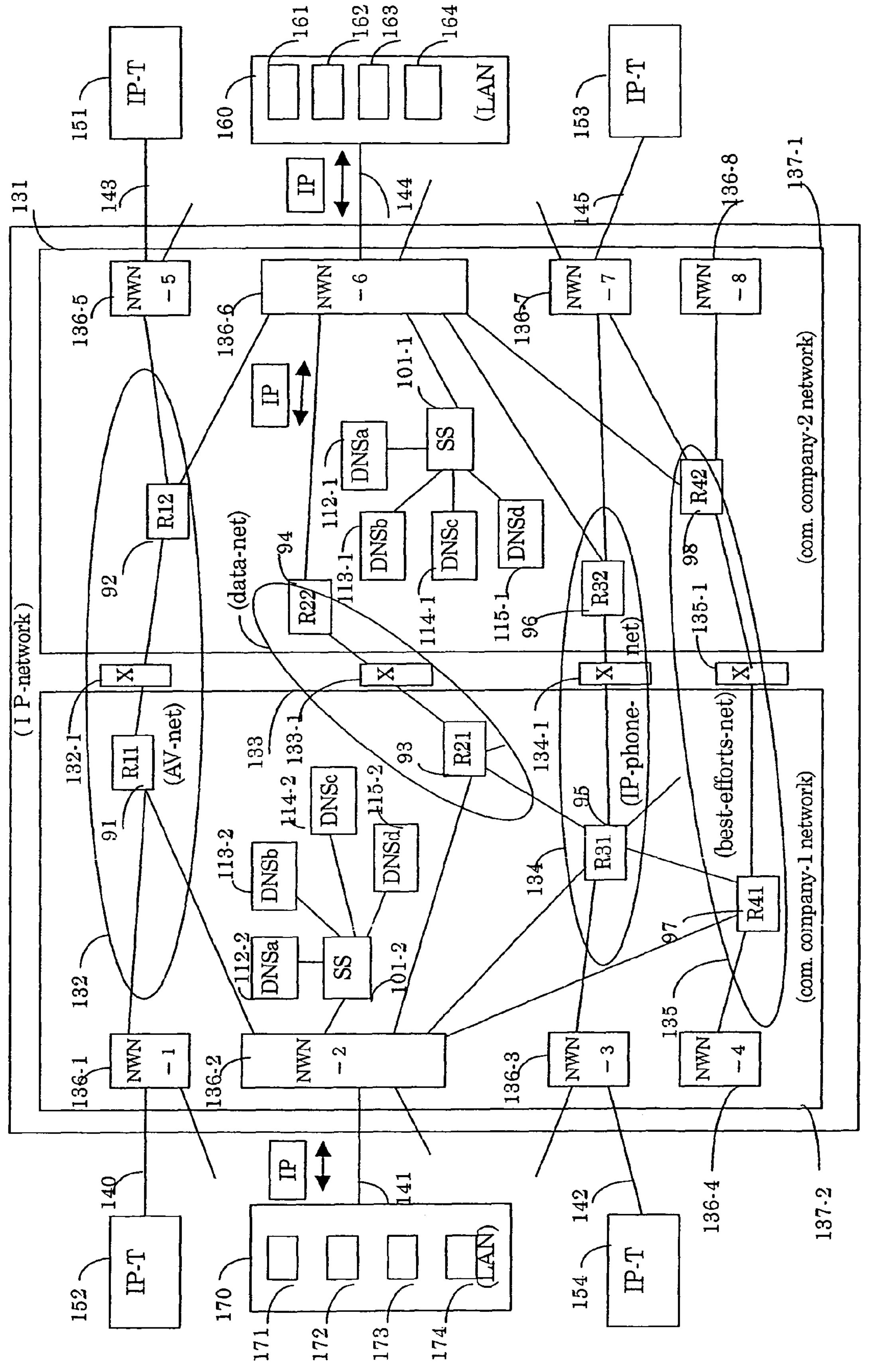
FIG. 25 is a schematic block diagram showing a fourth embodiment of the present invention.

4. Fourth Embodiment Selecting Domain Name Server:

As shown in FIG. 25, an integrated IP network 131 includes an IP audio-visual network 132, an IP data network 133, an IP telephone network 134, and a best effort network 135. Reference numbers 136-1, 136-2, 136-3, 136-4, 136-5, 136-6, 136-7 and 136-8 represent network node devices. The network node devices 136-1 to 136-8 are connected to one or more of the IP networks via communication circuits. The network node-points of the network node devices are connected to external terminals 151, 152, 153, 154 of the integrated IP network 131 and to internal terminals of LAN 160 and LAN 170 via communication circuits 140, 141, 142, 143, 144, 145. The network node devices have an address management table containing the IP addresses assigned to the external terminals and the port numbers.

The integrated IP network 131 includes domain name servers 112-1, 112-2 dedicated for the IP audio-visual network 132, domain name servers 113-1, 113-2 dedicated for the IP data network 133, domain name servers 114-1, 114-2 dedicated for the IP telephone network 134, and domain name servers 115-1, 115-2 dedicated for best effort network 135. These domain name servers have a one-to-one correspondence between the IP address of the external terminal and the host name of the terminal. A block 101-1 connected to the network node device 136-6 is a DNS selection server that has a function of selecting one of the domain name servers 112-1, 113-1, 114-1, 115-1. 101-2 connected to the network node device 136-2 is a "DNS selection server" which has a function of selecting one of the domain name servers 112-2, 113-2, 114-2, 115-2. 137-1 in the integrated IP network 131 represents the range of IP network managed by the communication company X, and 137-2 in the integrated IP network 131 represents the range of IP network managed by the communication company Y. The IP network 137-1 includes the DNS selection server 101-1 and the domain name servers 112-1, 113-1, 114-1, 115-1, and the IP network 137-2 includes the DNS selection server 101-2 and domain name servers 112-2, 113-2, 114-2, 115-2.

Next, the operation of these devices will be explained by referring to FIGS. 26 to 30.

Figure 26:
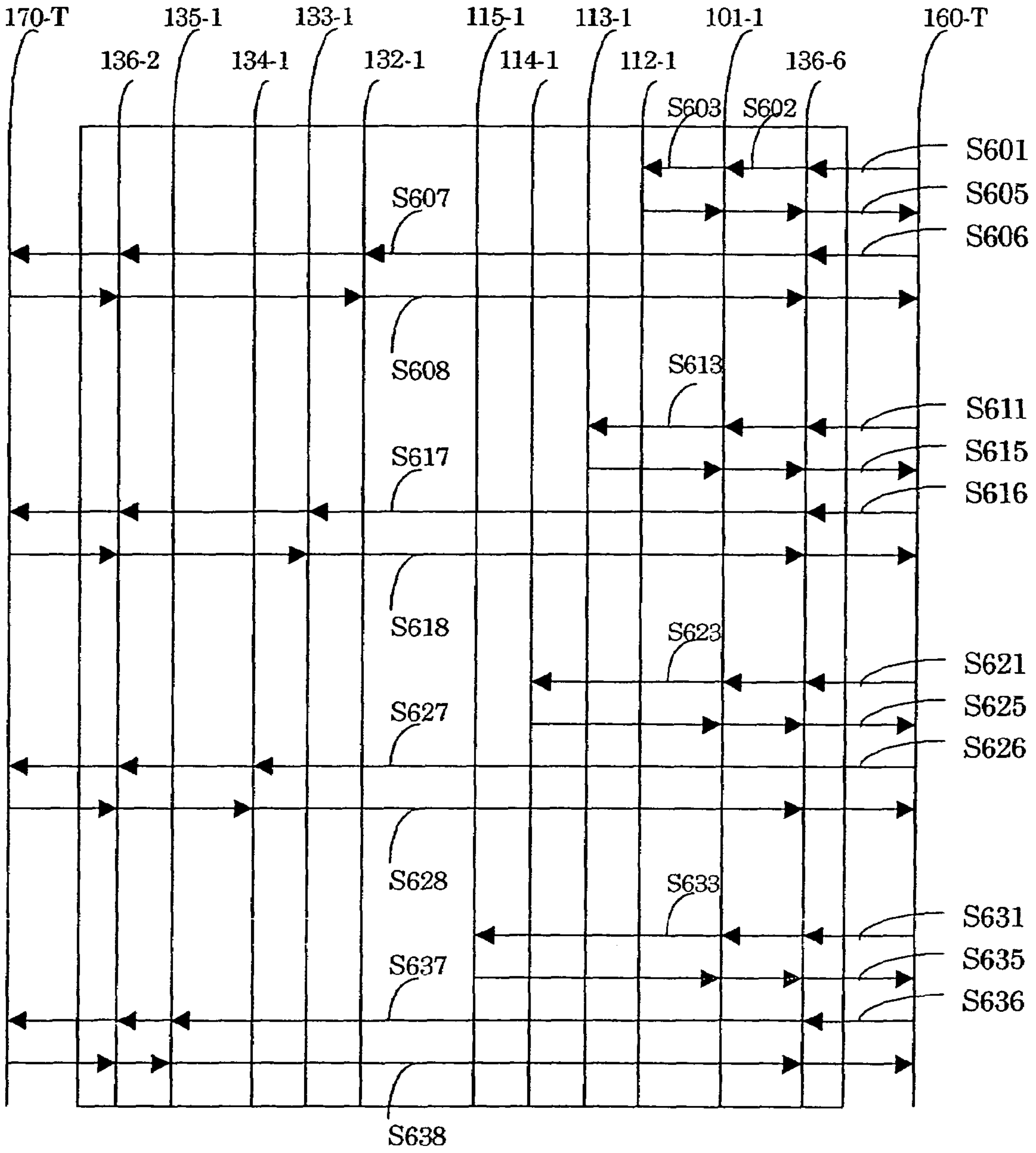
FIG. 26 is a timing chart showing how the IP packet used in the fourth embodiment is transmitted and received.
Figure 27:
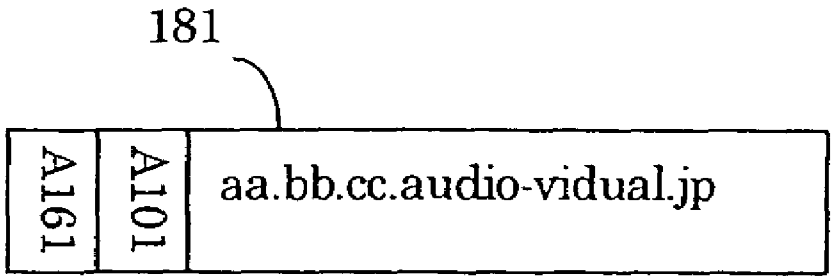
FIG. 27 is an explanatory diagram showing how an IP packet used in the fourth embodiment is transmitted and received.
Figure 28:
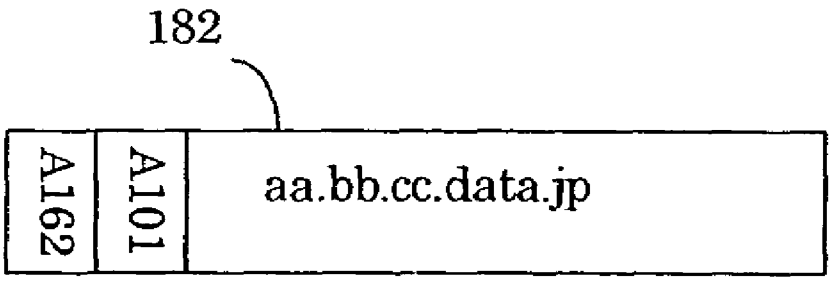
FIG. 28 is an explanatory diagram showing how the IP packet used in the fourth embodiment is transmitted and received.

Reference numerals 160-T and 170-T in FIG. 26 represent terminals inside LAN 160 and LAN 170. First, the audio-visual terminal 161 sends an IP packet 181 to the network node device 136-6 (Step S601); the network node device 136-6 transfers the IP packet 181 to the DNS selection server 101-1 (Step S602); the DNS selection server 101-1 finds an IP network-specifying code contained in "aa.bb.cc.audio-visual.jp" of the data section of the IP packet, in this case "audio-visual", and hence transfers the IP packet 181 of FIG. 27 to the domain name server 112-1 for the IP audio-visual network (Step S603). The domain name server 112-1 returns to the terminal 161 the IP packet containing an IP address having a one-to-one correspondence with the host name "aa.bb.cc.audio-visual.jp" (Step S605). Then, the terminal 161 sends the IP packet toward the terminal 171 that is located at the IP address obtained in the above step which matches "aa.bb.cc.audio-visual.jp" (Steps S606 and S607). The terminal 171, upon receiving the IP packet, generates an IP packet for response and returns it to the terminal 161 (Step S608).

When the terminal 162 for IP data communication sends an IP packet 182 to the network node device 136-6 (Step S611), an operation performed is similar to the above. What differs from the above operation is that the DNS selection server 101-1 finds the IP network-specifying code contained in "aa.bb.cc.data.jp" of the data section of the IP packet 182 of FIG. 28, in this case "data", and therefore transfers the IP packet to the domain name server 113-1 for the IP data network (Step S613). The domain name server 113-1 returns to the terminal 162 an IP address having a one-to-one correspondence with the host name "aa.bb.cc.data.jp" (Step S615). Next, the terminal 162 sends the IP packet toward the terminal 172 that is located at the IP address corresponding one-to-one to "aa.bb.cc.data.jp" obtained in the above step (Steps S616 and S617). The terminal 172, upon receiving the IP packet, generates an IP packet for response and returns it to the terminal 162 (Step S618).

Figure 29:
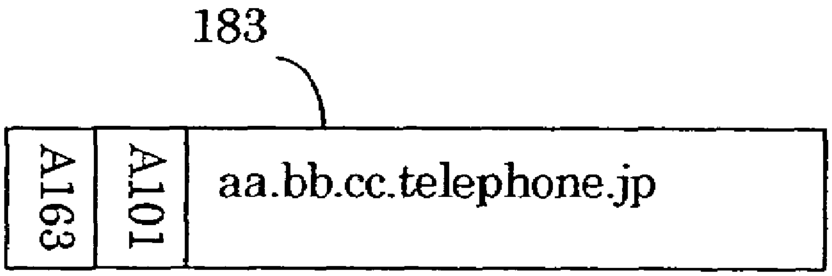
FIG. 29 is an explanatory diagram showing how the IP packet used in the fourth embodiment is transmitted and received.

When the IP telephone 163 sends an IP packet 183 of FIG. 29 to the network node device 136-6 (Step S621), an operation performed is similar to the above. What differs from the above operation is that the DNS selection server 101-1 finds the IP network-specifying code contained in "aa.bb.cc.telephone.jp" of the data section of the IP packet 183, in this case "telephone", and therefore transfers the IP packet 183 to the domain name server 114-1 for the IP telephone network (Step S623). The domain name server 114-1 returns to the IP telephone 163 an IP address corresponding one-to-one to the host name "aa.bb.cc.telephone.jp" (Step S625). Next, the telephone 163 sends the IP packet toward the IP telephone 173 that is located at the IP address corresponding one-to-one to "aa.bb.cc.telephone.jp" obtained in the above step (Steps S626, S627). The IP telephone 173, upon receiving the IP packet, generates an IP packet for response and returns it to the IP telephone 163 (Step S628).

Figure 30:
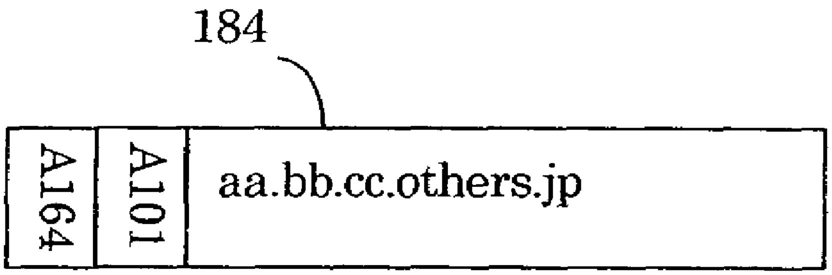
FIG. 30 is an explanatory diagram showing how-the IP packet used in the fourth embodiment-is transmitted and received.

When the data section of the IP packet 184 of FIG. 30 from the terminal 164 does not contain any code specifying IP audio-visual network, IP data network or IP telephone network, the DNS selection server 101-1 selects the domain name server 115-1 for the best effort network 135. Then, the terminal 164 uses the best effort network 135 to establish IP-communication with the terminal 174. In this way, the IP communications between the two terminals can use the IP audio-visual network, the IP data network, the IP telephone network or the best effort network.

As described above, with the present invention it is possible to eliminate the need to use expensive leased lines and to construct a relatively inexpensive large-scale communication system, without using the Internet that does not provide high-speed communication circuits for transferring TV and other video data and for which there is no person responsible for planning the expansion of its communication circuit facilities. Further, because the integrated IP network includes therein a plurality of separated IP networks with a variety of characteristics, such as IP telephone network, IP video network, IP electronic text network, best effort network, IP data multicast network and IP-based TV broadcast network, the overall cost can-be kept low.

What is claimed is:

1. An integrated IP network, wherein:

said integrated IP network includes a plurality of IP networks and a plurality of network node devices, said network node devices including address management tables comprising a plurality of records, a first network node device being connected to a first IP network via a first internal line and being connected to a second IP network via a second internal line, and a second network node device being connected to said first IP network via a third internal line and being connected to said second IP network via a fourth internal line, first and second records being set at an address management table in said first network node device, the first record comprising a network identifier that designates the first IP network and the second record comprising a network identifier that designates the second IP network a first terminal being connected to said first network node device by a first network node terminal via a first communication line, and a second terminal being connected to said second network node device by a second network node terminal via a second communication line; wherein:

when an external IP packet sent from said first terminal is input to said first network node device from said first network node terminal, said first network node device compares an IP address and a port number included in said external IP packet with an IP address and a port number included in said first record, and:

if the IP address and port number included in said external IP packet and the IP address and port number included in said first record coincide respectively, said first network node device IP-capsulates said external IP packet and then forms an internal IP packet, said first network node device sending said internal IP packet to said first internal line, and said internal IP packet being transferred in said first IP network and said third internal line and then reaching said second network node device, in compliance with the network identifier in said first record, if said IP addresses and said port numbers do not coincide, said first network node device compares the IP address and the port number included in said external IP packet with an IP address and a port number included in said second record, and if the IP address and port number included in said external IP packet and the IP address and port number included in said second record coincide respectively, said first network node device IP-capsulates said external IP packet and then forms an internal IP packet, said first network node device sending said internal IP packet to said second internal line, and said internal IP packet being transferred in said second IP network and said fourth internal line and then reaching said second network node device, in compliance with the network identifier in said second record, or if said IP addresses and said port numbers do not coincide, said external IP packet is discarded;

said external IP packet being restored from said internal IP packet at said second network node device, and said external IP packet being sent to said second terminal via said second communication line.

2. The integrated IP network according to claim 1, wherein said comparison on said addresses and said port numbers is carried out on addresses only.

3. The integrated IP network according to claim 1, wherein said first IP network is an IP telephone network or said second IP network is an IP data network.

4. The integrated IP network according to claim 1, wherein said first IP network is an IP multicast network or said second IP network is a best-effort network.

5. The integrated IP network of claim 1, further comprising at least one domain name server in one of said IP networks;

wherein the domain name server establishes a one-to-one correspondence between host names assigned to external terminals of the network and the IP addresses of said external terminals;

wherein the first address management table comprises a third record comprising an address of the domain name server; and wherein when said first terminal sends an initial external IP packet including a host name of a destination terminal and having a destination address of a domain name server to the first network node device, the first network node device compares the IP address of the first terminal and the destination address of the domain name server in said external IP packet with an IP address and the address of the domain name server in the third record; and if the IP address of the first terminal and the destination address of the domain name server in said external IP packet coincide with the IP address and the address of the domain name server in the third record; the first network node device converts said initial external IP packet into an internal IP packet directed at the domain name server in the third record and then sends the internal IP packet to said domain name server, said domain name server forming an internal IP packet including the destination terminal IP address having a one-to-one correspondence with said host name in said internal IP packet and then sends back said internal IP packet to the first network node device;

the first network node device returning an external IP packet comprising the destination terminal IP address to the first terminal, thus allowing the first terminal to send to the first network node device an external IP packet including an IP address, wherein said IP address is the destination terminal IP address.

6. An integrated IP network, wherein:

said integrated IP network includes a plurality of IP networks and a plurality of network node devices, said network node devices including address management tables comprising a plurality of records, a first network node device being connected to a first IP network via a first internal line and being connected to a second IP network via a second internal line, and a second network node device being connected to said first IP network via a third internal line and being connected to said second IP network via a fourth internal line, first and second records being set at an address management table in said first network node device, the first record comprising a network identifier that designates the first IP network and the second record comprising a network identifier that designates the second IP network a first terminal being connected to said first network node device by a first network node terminal via a first communication line, and a second terminal being connected to said second network node device by a second network node terminal via a second communication line; wherein:

when an external IP packet sent from said first terminal is input to said first network node device from said first network node terminal, said first network node device compares a port number included in said external IP packet with a port number included in said first record, and:

if the port number included in said external IP packet and the port number included in said first record coincide respectively, said first network node device IP-capsulates said external IP packet and then forms an internal IP packet, said first network node device sending said internal IP packet to said first internal line, and said internal IP packet being transferred in said first IP network and said third internal line and then reaching said second network node device, in compliance with the network identifier in said first record, if said said port numbers do not coincide, said first network node device compares the port number included in said external IP packet with a port number included in said second record, and if the port number included in said external IP packet and the port number included in said second record coincide respectively, said first network node device IP-capsulates said external IP packet and then forms an internal IP packet, said first network node device sending said internal IP packet to said second internal line, and said internal IP packet being transferred in said second IP network and said fourth internal line and then reaching said second network node device, in compliance with the network identifier in said second record, or if said port numbers do not coincide, said external IP packet is discarded;

said external IP packet being restored from said internal IP packet at said second network node device, and said external IP packet being sent to said second terminal via said second communication line.

7. The integrated IP network according to claim 6, wherein said first IP network is an IP telephone network, or said second IP network is an IP data network, an IP multicast network or a best-effort network.

* * * * *